(12) United States Patent
Pan

(10) Patent No.: US 9,332,478 B2
(45) Date of Patent: *May 3, 2016

(54) SYSTEM, METHOD, AND DEVICE FOR ROUTING CALLS USING A DISTRIBUTED MOBILE ARCHITECTURE

(71) Applicant: Lemko Corporation, Itasca, IL (US)

(72) Inventor: Shaowei Pan, Kildeer, IL (US)

(73) Assignee: Lemko Corporation, Itasca, IL (US)

( * ) Notice: Subject to any disclaimer, the term of this patent is extended or adjusted under 35 U.S.C. 154(b) by 180 days.

This patent is subject to a terminal disclaimer.

(21) Appl. No.: 13/648,704

(22) Filed: Oct. 10, 2012

(65) Prior Publication Data

US 2013/0039279 A1    Feb. 14, 2013

Related U.S. Application Data

(63) Continuation of application No. 12/942,642, filed on Nov. 9, 2010, now Pat. No. 8,310,990, which is a continuation of application No. 12/172,639, filed on Jul. 14, 2008, now Pat. No. 7,855,988.

(51) Int. Cl.
*H04W 4/00* (2009.01)
*H04W 40/00* (2009.01)
*H04W 88/16* (2009.01)
(Continued)

(52) U.S. Cl.
CPC ............. *H04W 40/00* (2013.01); *H04L 65/102* (2013.01); *H04L 65/1069* (2013.01); *H04W 88/16* (2013.01); *H04W 92/24* (2013.01)

(58) Field of Classification Search
None
See application file for complete search history.

(56) References Cited

U.S. PATENT DOCUMENTS

| 4,284,848 A | 8/1981 | Frost |
| 5,590,175 A | 12/1996 | Gallant et al. |
| 5,623,495 A | 4/1997 | Eng et al. |

(Continued)

FOREIGN PATENT DOCUMENTS

| CN | 1427637 A | 7/2003 |
| CN | 101044769 A | 9/2007 |

(Continued)

OTHER PUBLICATIONS

Hoffpauir et al., United States Statutory Invention Registration No. H1,918; Entitled "Integrated Authentication Center and Method for Authentication in a Wireless Telecommunications Network"; Filed Feb. 19, 1998; Published Nov. 7, 2000; 19 pages.

(Continued)

*Primary Examiner* — Bob Phunkulh
(74) *Attorney, Agent, or Firm* — Toler Law Group, P.C.

(57) ABSTRACT

A method includes transmitting communications information from a first DMA gateway of a DMA gateway communication network to a second DMA gateway of the DMA gateway communication network. The communications information is associated with a communication network that is accessible to the first DMA gateway. The method includes receiving a communication from the second DMA gateway via the DMA gateway communication network. The communication network and the DMA communication network are different. The communication is associated with a destination device that is indicated by the communications information to be served by the communication network that is accessible to the first DMA gateway. The method includes routing the communication to the destination device.

20 Claims, 15 Drawing Sheets

(51) Int. Cl.
  *H04W 92/24* (2009.01)
  *H04L 29/06* (2006.01)

(56) References Cited

U.S. PATENT DOCUMENTS

| | | |
|---|---|---|
| 5,623,532 A | 4/1997 | Houde et al. |
| 5,713,073 A | 1/1998 | Warsta |
| 5,734,979 A | 3/1998 | Lu et al. |
| 5,890,064 A | 3/1999 | Widergen et al. |
| 5,933,784 A | 8/1999 | Gallagher et al. |
| 5,991,639 A | 11/1999 | Rautiola et al. |
| 6,122,499 A | 9/2000 | Magnusson |
| 6,131,038 A | 10/2000 | Sekine |
| 6,141,564 A | 10/2000 | Bruner et al. |
| H1918 H | 11/2000 | Hoffpauir et al. |
| 6,160,804 A | 12/2000 | Ahmed et al. |
| 6,411,825 B1 | 6/2002 | Csapo et al. |
| 6,418,308 B1 | 7/2002 | Heinonen et al. |
| 6,421,325 B1 | 7/2002 | Kikinis |
| 6,515,985 B2 | 2/2003 | Shmulevich et al. |
| 6,539,237 B1 | 3/2003 | Sayers et al. |
| 6,542,497 B1 | 4/2003 | Curry et al. |
| 6,549,937 B1 | 4/2003 | Auerbach et al. |
| 6,584,098 B1 | 6/2003 | Dutnall |
| 6,611,533 B1 | 8/2003 | Liao et al. |
| 6,614,784 B1 | 9/2003 | Glitho et al. |
| 6,631,260 B1 | 10/2003 | Carey et al. |
| 6,647,426 B2 | 11/2003 | Mohammed |
| 6,678,155 B1 | 1/2004 | Bresniker |
| 6,694,134 B1 | 2/2004 | Lu et al. |
| 6,697,355 B1 | 2/2004 | Lim |
| 6,704,409 B1 | 3/2004 | Dilip et al. |
| 6,731,932 B1 | 5/2004 | Rune et al. |
| 6,735,184 B1 | 5/2004 | Davidson et al. |
| 6,751,207 B1 | 6/2004 | Lee et al. |
| 6,760,325 B1 | 7/2004 | Hameleers et al. |
| 6,763,226 B1 | 7/2004 | McZeal, Jr. |
| 6,763,233 B2 | 7/2004 | Bharatia |
| 6,791,988 B1 | 9/2004 | Hameleers et al. |
| 6,795,444 B1 | 9/2004 | Vo et al. |
| 6,807,431 B2 | 10/2004 | Sayers et al. |
| 6,807,432 B2 | 10/2004 | Hwang |
| 6,816,706 B1 | 11/2004 | Hohnstein et al. |
| 6,819,652 B1 | 11/2004 | Aravamudhan et al. |
| 6,829,473 B2 | 12/2004 | Raman et al. |
| 6,831,903 B2 | 12/2004 | Kang |
| 6,839,356 B2 | 1/2005 | Barany et al. |
| 6,859,652 B2 | 2/2005 | Karabinis et al. |
| 6,871,072 B1 | 3/2005 | Meche |
| 6,879,582 B2 | 4/2005 | Dhara et al. |
| 6,879,677 B2 | 4/2005 | Trandal et al. |
| 6,917,813 B2 | 7/2005 | Elizondo |
| 6,937,708 B2 | 8/2005 | Hirose |
| 6,958,983 B2 | 10/2005 | Musikka et al. |
| 6,985,454 B1 | 1/2006 | Wiedeman et al. |
| 7,003,286 B2 | 2/2006 | Brown et al. |
| 7,050,414 B2 | 5/2006 | Lin |
| 7,054,307 B2 | 5/2006 | Papadimitriou et al. |
| 7,054,322 B2 | 5/2006 | D'Annunzio et al. |
| 7,072,650 B2 | 7/2006 | Stanforth |
| 7,117,015 B2 | 10/2006 | Scheinert et al. |
| 7,120,435 B2 | 10/2006 | Usher et al. |
| 7,120,436 B2 | 10/2006 | Kim |
| 7,133,670 B1 | 11/2006 | Moll et al. |
| 7,133,923 B2 | 11/2006 | MeLampy et al. |
| 7,136,651 B2 | 11/2006 | Kalavade |
| 7,154,901 B2 | 12/2006 | Chava et al. |
| 7,158,621 B2 | 1/2007 | Bayne |
| 7,171,216 B1 | 1/2007 | Choksi |
| 7,299,039 B2 | 11/2007 | Lee et al. |
| 7,313,399 B2 | 12/2007 | Rhee et al. |
| 7,324,478 B2 | 1/2008 | Park et al. |
| 7,328,268 B1 | 2/2008 | Foltak et al. |
| 7,345,997 B2 | 3/2008 | Kim |
| 7,346,334 B2 | 3/2008 | Gaeta et al. |
| 7,349,412 B1 | 3/2008 | Jones et al. |
| 7,359,700 B2 | 4/2008 | Swensen et al. |
| 7,383,042 B2 | 6/2008 | Lamb et al. |
| 7,385,947 B2 | 6/2008 | Wu et al. |
| 7,406,069 B2 | 7/2008 | Yashar et al. |
| 7,424,313 B2 | 9/2008 | Ham et al. |
| 7,486,967 B2 | 2/2009 | Pan et al. |
| 7,490,132 B1 | 2/2009 | Lyle et al. |
| 7,522,632 B2 | 4/2009 | La Porta et al. |
| 7,536,170 B2 | 5/2009 | Goldman et al. |
| 7,539,158 B2 | 5/2009 | Pan |
| 7,548,763 B2 | 6/2009 | Pan |
| 7,552,670 B2 | 6/2009 | Goldman et al. |
| 7,606,594 B2 | 10/2009 | Jesse et al. |
| 7,653,414 B2 | 1/2010 | Pan |
| 7,738,488 B2 | 6/2010 | Marsico et al. |
| 7,760,695 B2 | 7/2010 | Gopalakrishnan et al. |
| 7,787,879 B1 | 8/2010 | Philips et al. |
| 7,840,230 B2 | 11/2010 | Pan |
| 7,855,988 B2 | 12/2010 | Pan |
| 7,856,233 B2 | 12/2010 | Pan |
| 7,979,066 B2 | 7/2011 | Pan |
| 8,018,907 B2 | 9/2011 | Kubler et al. |
| 8,036,158 B2 | 10/2011 | Pan et al. |
| 8,046,420 B2 | 10/2011 | Pan |
| 8,086,536 B2 | 12/2011 | Dublish et al. |
| 8,089,920 B2 | 1/2012 | Pan |
| 8,107,409 B2 | 1/2012 | Pan |
| 8,213,909 B2 | 7/2012 | Lee et al. |
| 8,224,322 B2 | 7/2012 | Pan |
| 8,310,990 B2 | 11/2012 | Pan |
| 8,340,667 B2 | 12/2012 | Pan |
| 8,351,420 B2 | 1/2013 | Linkola et al. |
| 8,359,029 B2 | 1/2013 | Pan |
| 8,676,155 B2 | 3/2014 | Fan et al. |
| 8,717,009 B2 | 5/2014 | Tu |
| 2001/0013050 A1 | 8/2001 | Shah |
| 2001/0036173 A1 | 11/2001 | Shmulevich et al. |
| 2001/0046859 A1 | 11/2001 | Kil |
| 2001/0055298 A1 | 12/2001 | Baker et al. |
| 2002/0009060 A1 | 1/2002 | Gross |
| 2002/0015392 A1 | 2/2002 | Musikka et al. |
| 2002/0016180 A1 | 2/2002 | Derosier et al. |
| 2002/0045444 A1 | 4/2002 | Usher et al. |
| 2002/0051518 A1 | 5/2002 | Bondy et al. |
| 2002/0058502 A1 | 5/2002 | Stanforth |
| 2002/0061746 A1 | 5/2002 | Jo et al. |
| 2002/0160772 A1 | 10/2002 | Gailey et al. |
| 2002/0169887 A1 | 11/2002 | MeLampy et al. |
| 2003/0048766 A1 | 3/2003 | D'Annunzio et al. |
| 2003/0063721 A1 | 4/2003 | Hirose |
| 2003/0088698 A1 | 5/2003 | Singh et al. |
| 2003/0092441 A1 | 5/2003 | Taha et al. |
| 2003/0096628 A1 | 5/2003 | Bar-On et al. |
| 2003/0100302 A1 | 5/2003 | Armbruster et al. |
| 2003/0100342 A1 | 5/2003 | Ham et al. |
| 2003/0112748 A1 | 6/2003 | Puppa et al. |
| 2003/0153343 A1 | 8/2003 | Crockett et al. |
| 2003/0154306 A1 | 8/2003 | Perry |
| 2003/0186694 A1 | 10/2003 | Sayers et al. |
| 2003/0198325 A1 | 10/2003 | Bayne |
| 2004/0014466 A1 | 1/2004 | Jesse et al. |
| 2004/0018829 A1 | 1/2004 | Raman et al. |
| 2004/0019539 A1 | 1/2004 | Raman et al. |
| 2004/0156495 A1 | 8/2004 | Chava et al. |
| 2004/0203621 A1 | 10/2004 | Brown et al. |
| 2004/0203677 A1 | 10/2004 | Brown et al. |
| 2004/0204097 A1 | 10/2004 | Scheinert et al. |
| 2004/0253949 A1 | 12/2004 | Swensen et al. |
| 2004/0253984 A1 | 12/2004 | Csapo et al. |
| 2004/0259556 A1 | 12/2004 | Czys |
| 2005/0044152 A1 | 2/2005 | Hardy et al. |
| 2005/0064922 A1 | 3/2005 | Owens et al. |
| 2005/0070278 A1 | 3/2005 | Jiang |
| 2005/0075106 A1 | 4/2005 | Jiang |
| 2005/0091392 A1 | 4/2005 | Gesswein et al. |
| 2005/0176413 A1 | 8/2005 | Lee et al. |
| 2005/0220054 A1 | 10/2005 | Meier et al. |
| 2005/0249176 A1 | 11/2005 | O'Neil et al. |

(56) References Cited

U.S. PATENT DOCUMENTS

| | | |
|---|---|---|
| 2005/0250491 A1 | 11/2005 | Roy et al. |
| 2006/0026252 A1 | 2/2006 | Caspi et al. |
| 2006/0046714 A1 | 3/2006 | Kalavade |
| 2006/0046760 A1 | 3/2006 | Bertino et al. |
| 2006/0047836 A1 | 3/2006 | Rao et al. |
| 2006/0052113 A1 | 3/2006 | Ophir et al. |
| 2006/0063544 A1 | 3/2006 | Zhao et al. |
| 2006/0098661 A1 | 5/2006 | Pan |
| 2006/0114934 A1 | 6/2006 | Shin et al. |
| 2006/0141984 A1 | 6/2006 | Taglienti et al. |
| 2006/0142011 A1 | 6/2006 | Kallio |
| 2006/0148465 A1 | 7/2006 | Perdomo et al. |
| 2006/0159039 A1 | 7/2006 | Jung et al. |
| 2006/0203746 A1 | 9/2006 | Maggenti et al. |
| 2006/0217121 A1 | 9/2006 | Soliman et al. |
| 2006/0221912 A1 | 10/2006 | Olivier et al. |
| 2006/0234747 A1 | 10/2006 | Pan |
| 2006/0234774 A1 | 10/2006 | Pan et al. |
| 2006/0258358 A1 | 11/2006 | Kallio |
| 2007/0008968 A1 | 1/2007 | Baker et al. |
| 2007/0010245 A1 | 1/2007 | Levitan |
| 2007/0021097 A1 | 1/2007 | Gaeta et al. |
| 2007/0021118 A1 | 1/2007 | Ophir |
| 2007/0060124 A1 | 3/2007 | Kalavade |
| 2007/0076697 A1 | 4/2007 | Huotari et al. |
| 2007/0082684 A1 | 4/2007 | Rozenstrauch et al. |
| 2007/0087738 A1 | 4/2007 | Melkesetian |
| 2007/0127423 A1 | 6/2007 | Ho |
| 2007/0147598 A1 | 6/2007 | Somes et al. |
| 2007/0197215 A1 | 8/2007 | Ben-Yehuda et al. |
| 2007/0202847 A1 | 8/2007 | Pan |
| 2007/0213075 A1 | 9/2007 | Jiang |
| 2007/0230352 A1 | 10/2007 | Kokku et al. |
| 2007/0232267 A1 | 10/2007 | Pan |
| 2007/0232304 A1 | 10/2007 | Goldman et al. |
| 2007/0234892 A1 | 10/2007 | Goldman et al. |
| 2007/0243891 A1 | 10/2007 | Civanlar et al. |
| 2007/0271606 A1 | 11/2007 | Amann et al. |
| 2007/0287452 A1 | 12/2007 | Pan |
| 2007/0291910 A1 | 12/2007 | Bucchieri et al. |
| 2007/0293216 A1 | 12/2007 | Jiang |
| 2008/0013531 A1 | 1/2008 | Elliott et al. |
| 2008/0039144 A1 | 2/2008 | Pan et al. |
| 2008/0080438 A1 | 4/2008 | Gopalakrishnan et al. |
| 2008/0101314 A1 | 5/2008 | Bachmutsky |
| 2008/0101410 A1 | 5/2008 | Barkley et al. |
| 2008/0134295 A1 | 6/2008 | Bailey et al. |
| 2008/0146158 A1 | 6/2008 | Pan |
| 2008/0160997 A1 | 7/2008 | Kim |
| 2008/0168523 A1 | 7/2008 | Ansari et al. |
| 2008/0244014 A1 | 10/2008 | Britton et al. |
| 2008/0261580 A1* | 10/2008 | Wallentin et al. ............. 455/418 |
| 2009/0003269 A1 | 1/2009 | Kumazawa et al. |
| 2009/0022155 A1 | 1/2009 | Rosenberg et al. |
| 2009/0031244 A1 | 1/2009 | Brezina et al. |
| 2009/0067441 A1 | 3/2009 | Ansari et al. |
| 2009/0156213 A1 | 6/2009 | Spinelli et al. |
| 2009/0186626 A1 | 7/2009 | Raghothaman |
| 2009/0215449 A1 | 8/2009 | Avner |
| 2009/0227230 A1 | 9/2009 | Camilleri et al. |
| 2009/0227235 A1 | 9/2009 | Pan |
| 2009/0228555 A1 | 9/2009 | Joviak et al. |
| 2009/0270097 A1 | 10/2009 | Gallagher et al. |
| 2009/0271491 A1 | 10/2009 | Pan |
| 2009/0292785 A1 | 11/2009 | Leedberg et al. |
| 2009/0325584 A1 | 12/2009 | Pan |
| 2009/0327819 A1 | 12/2009 | Pan |
| 2010/0008306 A1 | 1/2010 | Pan |
| 2010/0008369 A1 | 1/2010 | Pan |
| 2010/0048197 A1 | 2/2010 | Jiang |
| 2010/0048208 A9 | 2/2010 | Gunaratnam et al. |
| 2010/0057485 A1 | 3/2010 | Luft |
| 2010/0057732 A1 | 3/2010 | O'Sullivan et al. |
| 2010/0075668 A1 | 3/2010 | Pan |
| 2010/0080214 A1 | 4/2010 | Li et al. |
| 2010/0094878 A1 | 4/2010 | Soroca et al. |
| 2010/0199340 A1 | 8/2010 | Jonas et al. |
| 2010/0217809 A1 | 8/2010 | Vymenets et al. |
| 2010/0217837 A1 | 8/2010 | Ansari et al. |
| 2011/0059740 A1 | 3/2011 | Pan |
| 2011/0060853 A1 | 3/2011 | Pan |
| 2011/0223921 A1 | 9/2011 | Pan |
| 2011/0320576 A1 | 12/2011 | Lauer et al. |
| 2012/0002607 A1 | 1/2012 | Pan |
| 2012/0020293 A1 | 1/2012 | Nix, Jr. et al. |
| 2012/0044908 A1 | 2/2012 | Spinelli et al. |
| 2012/0094659 A1 | 4/2012 | Pan |
| 2012/0106454 A1 | 5/2012 | Pan |
| 2012/0224586 A1 | 9/2012 | Nag et al. |
| 2012/0252444 A1 | 10/2012 | Pan |
| 2012/0324041 A1 | 12/2012 | Gerber et al. |
| 2013/0130677 A1 | 5/2013 | Pan |
| 2013/0148578 A1 | 6/2013 | Pan |
| 2015/0081812 A1 | 3/2015 | Davies et al. |

FOREIGN PATENT DOCUMENTS

| | | |
|---|---|---|
| EP | 0365885 | 5/1990 |
| WO | 2007102003 A1 | 9/2007 |

OTHER PUBLICATIONS

B.G. Evans and K. Baughan; "Visions of 4G"; Electronics & Communication Engineering Journal; Dec. 2000; pp. 293-303.

Shirshanka Das, Alok Nandan & Giovanni Pau (University of CA, Los Angeles, CA, USA); "SPAWN: A Swarming Protocol for Vehicular Ad-Hoc Wireless Networks"; VANET'04, Oct. 1, 2004, Philadelphia, PA, USA; ACM 1-58113-922-5/04/0010; 2 pgs.

Yu-Chee Tseng, Chia-Ching Shen (National Chiao Tung University) & Wen-Tsuen Chen (National Tsing Hua University); "Integrating Mobile IP with AD Hoc Networks"; IEEE Computer Society; 0018-9162/03; 2003 IEEE; May 2003; pp. 48-55.

Halim Yanikomeroglu, David D. Falconer & Van M. Sreng; "Coverage Enhancement Through Two-Hop Peer-to-Peer Relaying in Cellular Radio Networks"; Broadband Communications and Wireless Systems (BCWS) Centre Department of Systems & Computer Engineering, Carleton University, Ottawa, Canada; WWRF Meeting #7, Eindhoven, the Netherlands, Dec. 3-4, 2002, WG4: Spectrum, New Air Interfaces and Ad-Hoc Networking Multi-Hop Wireless Systems; 10 pages.

Bur Goode; "Voice Over Internet Protocol (VoIP)"; 0018-9219/02 2002 IEEE; Proceedings of the IEEE; vol. 90, No. 9, Sep. 2002; pp. 1495-1517.

Kyung-Hyu Lee, Kyu-Ok Lee & Kwon-Chul Park (Network Research Laboratory ETRI Korea) Jong-Ok Lee and Yoon-Hak Bang (Network Planning Team KT Korea); "Architecture to be Deployed on Strategies of Next-Generation Networks"; 0/7803-7802-4/03 2003 IEEE; pp. 819-822.

Wolfgang Kellerer, Christian Bettstetter, Christian Schwingenschlögl & Peter Sties (Technische Universität München) Karl-Ernst Steinberg (BMW) & Hans-Jörg Vögel (the Fantastic Corp); "(Auto) Mobile Communication in a Heterogeneous and Converged World"; IEEE Personal Communications; Dec. 2001; 1070-9916/01; 2001 IEEE pp. 41-47.

Nilanjan Banerjee & Sajal K. Das (University of Texas, Arlington) & Arup Acharya (IBM T.J. Watson Research Center)' "Peer-to-peer SIP-based Services over Wireless Ad Hoc Networks"; BROADWIM: Broadband Wireless Multimedia Workshop; Oct. 29, 2004—broadnets.org; *This work was supported by NSF under the ORBIT testbed project, grant # NSF NRT Project #ANI-0335244 and by NSF ITR grant IIS-0326505; 8 pages.

Hung-Yu Wei (Columbia University) & Richard D. Gitlin (NEC Laboratories America); "Two-Hop-Relay Architecture for Next-Generation WWAN/WLAN Integration"; 4G Mobile Communications: Toward Open Wireless Architecture; 1536-1284/04 2004 IEEE; IEEE Wireless Communications; Apr. 2004; pp. 2-9.

Wolfgang Kellerer (LKN, Munich University of Technology), Hans-Jörg Vögel (the Fantastic Corp.) & Karl-Ernst Steinberg (BMW); "A

(56) References Cited

OTHER PUBLICATIONS

Communication Gateway for Infrastructure Independent Wireless Access"; IEEE Communications Magazine; Mar. 2002; vol. 9; No. 3; 6 pages.

Willie W. Lu & Jenny Hu (U.S. Center for Wireless Communications, Stanford University, CA); "Open Wireless Architecture—The Core to 4G Mobile Communications"; China Communications; Apr. 2006; pp. 32-39.

Ralf Pabst, Bernard H. Walke & Daniel C. Schultz (RWTH Aachen University) Patrick Herhold & Gerhard P. Fettweis (Technical University of Dresden) Halim Yanikomeroglu & David D. Falconer (Carleton University) Sayandev Mukherjee & Harish Viswanathan (Lucent Technologies) Matthias Lott & Wolfgang Zirwas (Siemens ICM) Mischa Dohler & Hamid Aghvami (Kings College); "Relay-Based Deployment Concepts for Wireless and Mobile Broadband Radio"; 0163-6804/04; 2004 IEEE; IEEE Communications Magazine; Sep. 2004; pp. 80-89.

Simone Frattasi, Hanane Fathi, Frank H.P. Fitzek & Ramjee Prasad (Aalborg University) Marcos D. Katz (Samsung Electronics); "Defining 4G Technology from the User's Perspective"; IEEE Network; Jan./Feb. 2006; 0890-8044/06; 2006 IEEE; pp. 35-41.

Ian F. Akyildiz (Broadband and Wireless Networking BWN Lab, Georgia Institute of Technology) Xudong Wang & Weilin Wang (Kiyon, Inc. La Jolla, CA); "Wireless Mesh Networks: A Survey"; Computer Networks 47; Jan. 1, 2005; pp. 445-487; 1389-1286 2004 Elsevier B.V.

Brian Woerner (Virginia Tech, Blacksburg, VA) & Mostofa Howlader (University of Tennessee, Knoxville, TN); "Research Directions for Fourth Generation Wireless"; Proceedings of the 10th IEEE International Workshops on Enabling Technologies: Infrastructure for Collaborative Enterprises (WETICE 2001); Jun. 20-22, 2001; Cambridge, MA, USA; IEEE Computer Society 2001; ISBN 0/7695-1269-0; 2 pages.

"Framework and Overall Objectives of the Future Development of IMT-2000 and Systems Beyond IMT-2000"; International Telecommunication Union; ITU-R Radiocommunication Sector of ITU; Recommendation ITU-R M.1645 (Jun. 2003); M Series; Mobile, Radiodetermination, Amateur and Related Satellite Services; 26 pages.

Non-Final Office Action for U.S. Appl. No. 12/172,639, mailed May 21, 2010, 6 pages.

Notice of Allowance and Fee(s) Due for U.S. Appl. No. 12/172,639, mailed Sep. 17, 2010, 4 pages.

The International Search Report and the Written Opinion from the International Searching Authority (ISA/KR) for International Application No. PCT/US2009/045973, mailed Jan. 18, 2010, 14 pages.

Non-Final Office Action for U.S. Appl. No. 12/942,642, mailed Nov. 7, 2011, 20 pages.

Notice of Allowance for U.S. Appl. No. 12/942,642, mailed Mar. 1, 2012, 9 pages.

Notice of Allowance for U.S. Appl. No. 12/942,642, mailed Apr. 9, 2012, 23 pages.

Notice of Allowance for U.S. Appl. No. 12/942,642, mailed Jul. 10, 2012, 9 pages.

Extended European Search Report for European Application No. 05801092.7-1525/1810465, PCT/US05/035648 mailed Jan. 31, 2011, 72 pages.

Notification of the First Office Action for United Kingdom Application No. GB0706179.9 mailed Sep. 18, 2008, 3 pages.

First Examination Report for Indian Application No. 469/MUMNP/2007, dated Mar. 30, 2013, 3 pages.

International Report on Patentability and Written Opinion of the International Search Authority for International Application No. PCT/US05/35648 from the International Searching Authority, mailed on Aug. 24, 2006, 8 pages.

International Search Report and Written Opinion of the International Search Authority for International Application No. PCT/US09/045951 from the International Searching Authority, mailed on Dec. 30, 2009, 8 pages.

International Search Report and Written Opinion of the International Search Authority for International Application No. PCT/US09/045957 from the International Searching Authority, mailed on Jan. 14, 2010, 8 pages.

International Search Report and Written Opinion of the International Search Authority for International Application No. PCT/US09/045968 from the International Searching Authority, mailed on Jan. 21, 2010, 9 pages.

Notification of First Office Action for Chinese Application No. 200980126758.7, mailed on Mar. 29, 2013, 8 pages.

Yu, W. et al., Abstract of "Reverse Link Capacity Analysis on Distributed Wireless Communication System", Journal of Beijing University of Posts and Telecommunications, 2004, Issue 3, Retrieved from <<http://en.cnki.com/article_en/CJFDTOTAL-BJYD200403020.htm>>, 3 pages.

First Office Action issued by the Chinese Patent Office, Mar. 29, 2013 for CN Application No. 200980126758.7, 10 pages.

Fourth Office Action issued by the Chinese Patent Office, Oct. 27, 2014 for CN Application No. 200980126758.7, 22 pages.

Response to First Office Action issued by the Chinese Patent Office, Mar. 29, 2013 for CN Application No. 200980126758.7, 12 pages.

Response to Second Office Action issued by the Chinese Patent Office, Nov. 18, 2013 for CN Application No. 200980126758.7, 25 pages.

Response to Third Office Action issued by the Chinese Patent Office, May 16, 2014 for CN Application No. 200980126758.7, 25 pages.

Second Office Action issued by the Chinese Patent Office, Nov. 18, 2013 for CN Application No. 200980126758.7, 10 pages.

Third Office Action issued by the Chinese Patent Office, May 16, 2014 for CN Application No. 200980126758.7, 15 pages.

Notice of Grant for Chinese Application No. 200980126758.7 dated Mar. 24, 2015, 4 pages.

\* cited by examiner

SYSTEM, METHOD, AND DEVICE FOR ROUTING CALLS USING A DISTRIBUTED MOBILE ARCHITECTURE

CLAIM OF PRIORITY

The present application claims priority from and is a continuation of U.S. patent application Ser. No. 12/942,642 filed on Nov. 9, 2010 and entitled "SYSTEM, METHOD, AND DEVICE FOR ROUTING CALLS USING A DISTRIBUTED MOBILE ARCHITECTURE," which is a continuation of and claims priority from U.S. Pat. No. 7,855,988 filed on Jul. 14, 2008 and entitled "SYSTEM, METHOD, AND DEVICE FOR ROUTING CALLS USING A DISTRIBUTED MOBILE ARCHITECTURE," the contents of each of which are expressly incorporated herein by reference in their entirety.

FIELD OF THE DISCLOSURE

The present disclosure relates generally to mobile communications systems.

BACKGROUND

Access to basic telephony service is particularly important for rural and isolated communities. Telephony access allows small-scale enterprises, cooperatives, and fainters to obtain accurate information on fair prices for their products and to access regional and national markets. Access also reduces the cost of transportation and supports the local tourist industry. By bringing markets to people via telecommunications, rather than forcing people to leave in search of markets, urban migration is reduced and greater income and employment potential are generated in rural areas.

Unfortunately, the last decade of the telecommunications boom has not alleviated the disparities between urban and rural communities. The average imbalance, in terms of telephone penetration, in Asia, for example, is over ten to one and is often as high as twenty to one. This means that a country whose urban markets have a penetration of four (4) telephone lines per one-hundred (100) inhabitants, e.g., India and Pakistan, has a rural penetration of less than 0.2 per one-hundred (100). The situation is more acute in most African countries and in some parts of Latin America. By comparison, the disparity in average income level between urban and rural residents in the developing world is usually less than four to one.

Current telephone systems are expensive to deploy. For example, a typical cellular system that includes a mobile switching center (MSC), a base station controller (BSC), and a home location register/visitor location register (HLR/VLR) can cost over $2.0 million. Moreover, such a system may require a minimum of ten thousand users in order to be economically viable. In many rural areas, the population is not large enough to support the installation of such a system. Further, in many cases, the conditions in which the equipment (e.g., the MSC, BSC, and HLR/VLR) is to be operated are extremely harsh and environmentally prohibitive. An alternative to such a cellular system can include a wired system, but the costs associated with deploying and maintaining land lines are too high for certain rural areas.

In deploying telephone systems in such situations, a further concern is how to expand an existing telephone system or implement a new phone system capable of operating with existing telephone systems. For example, it may be desirable to allow communications with users serviced by existing public switched telephone network (PSTN) services, Voice over Internet Protocol (VoIP) systems, wireless communications systems, and other systems. Providing compatibility between these systems presents a challenge. Moreover, because some of these systems may be deployed in rural or other remote areas, providing a medium through which newly deployed systems can communicate with one another presents a further challenge.

Accordingly, there exists a need for an improved communications system that is relatively inexpensive to deploy and relatively inexpensive to operate, as well as able to integrate different communications systems.

BRIEF DESCRIPTION OF THE DRAWINGS

The present disclosure is pointed out with particularity in the appended claims. However, other features are described in the following detailed description in conjunction with the accompanying drawings in which:

DETAILED DESCRIPTION

Figure 1:
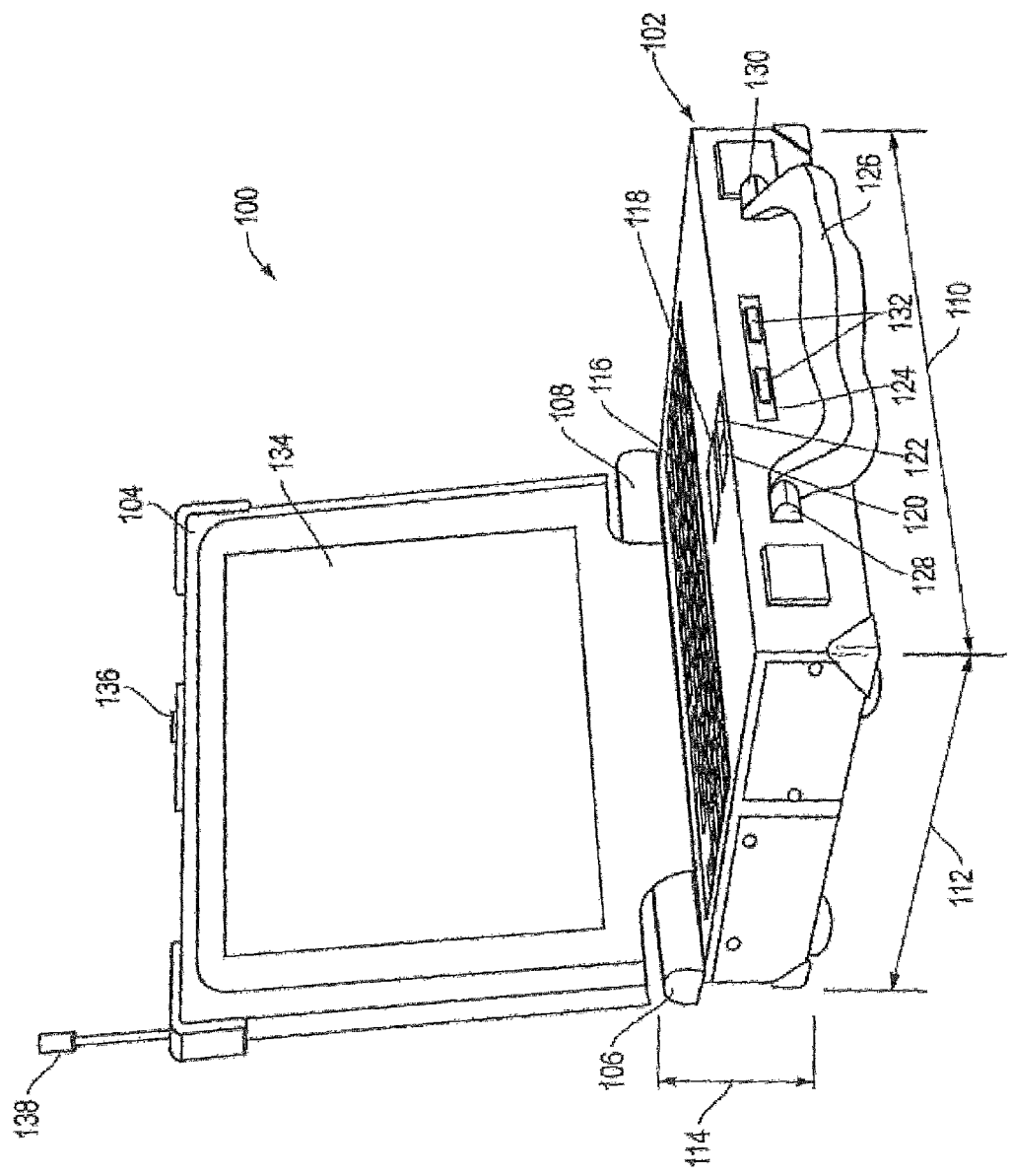
FIG. 1 is a view of a particular illustrative embodiment of a distributed mobile architecture (DMA) server having a first illustrative form factor.

Methods and devices for routing communications between distributed mobile architecture (DMA) servers using DMA gateways are disclosed. Communications information is received at a first DMA gateway for a communications network accessible by a second DMA gateway. The communications information indicates one or more devices that are accessible by one of a DMA server and a legacy communications network. The first DMA gateway and the second DMA gateway participate in a DMA gateway communications network. The communications information is stored by the first DMA gateway (e.g., in a home DMA register of the first DMA gateway). A communication is received at the first DMA gateway for a target device indicated by the communications information to be served by the second DMA gateway. The communication is routed from the first DMA gateway to the target device by relaying the communication from the first DMA gateway to the second DMA gateway via the DMA gateway communications network.

In a particular embodiment, a non-transitory computer-readable storage medium includes instructions that are executable by a processor. The instructions, when executed by the processor, cause the processor to receive communications information at a first DMA gateway of a DMA gateway communications network. The communications information is associated with a communications network that is accessible by a second DMA gateway of the DMA gateway communications network. The communications information is stored at a memory of the first DMA gateway. A communication is received that is associated with a destination device indicated by the communications information to be served by the second DMA gateway. The communication is routed to the destination device by relaying the communication from the first DMA gateway to the second DMA gateway via the DMA gateway communications network.

In another particular embodiment, a non-transitory computer-readable storage medium includes instructions that are executable by a processor. The instructions, when executed by the processor, cause the processor to receive first routing instructions at a first DMA server. The first routing instructions are received when the first DMA server is in a first service area of the first DMA gateway (e.g., an orbiting satellite). A first call is sent to the first DMA gateway via a private Internet Protocol (IP) network according to the first routing instructions. The first call is received at the first DMA server from a first mobile communication device via a wireless transceiver integrated with the first DMA server. The first call is placed to a destination device that is accessible via a legacy communications network. The legacy communications network is accessible via the first DMA gateway.

In another particular embodiment, a non-transitory computer-readable storage medium includes instructions that are executable by a processor. The instructions, when executed by the processor, cause the processor to receive a first call via a first interface of an orbiting satellite. The first interface is adapted to communicate with a legacy communications network, and the call is directed to a mobile communication device that is accessible to a first DMA server. The first call is routed to the first DMA server via a second interface of the orbiting satellite that is adapted to communicate with a private IP network. The first DMA server includes a wireless transceiver to communicate with the mobile communication device.

In another particular embodiment, a first DMA gateway includes a number of interfaces. A first interface is adapted to communicate with a legacy communications network. A second interface is adapted to communicate with a private Internet Protocol (IP) network. A third interface is adapted to communicate with a DMA gateway communications network. The gateway also includes a server having logic adapted to receive legacy network information from a second DMA gateway, the legacy network information indicating that the legacy communications network is in a communications range of the second DMA gateway. The DMA gateway forwards information associated with a communication received from a DMA server via the second interface to the second DMA gateway via the third interface. The call is placed to a destination device accessible via the legacy communications network.

In another particular embodiment, first routing instructions at a first distributed mobile architecture (DMA) server from a first DMA gateway when the first DMA server is in a first service area of the first DMA gateway. The first DMA gateway comprises a first orbiting satellite. A first call received at the first DMA server from a first mobile communications device via a wireless transceiver integrated with the first DMA server is sent to the first DMA gateway via a private Internet Protocol (IP) network according to the first routing instructions. The first call is placed to a destination device accessible via a legacy communications network, the legacy communications network accessible via the first DMA gateway.

In another embodiment, a distributed mobile architecture (DMA) server is coupled to a wireless transceiver. The DMA server includes a first interface adapted to communicate with a private Internet Protocol (IP) network and a second interface adapted to communicate with a satellite communications network. The DMA server includes a server having logic adapted to receive a call from a mobile communications device via the wireless transceiver and send call information related to the call to a DMA gateway. The DMA gateway comprises an orbiting satellite. The call is placed to a destination device accessible via a legacy communications network, the legacy communications network accessible via the DMA gateway.

In yet another embodiment, an orbiting satellite includes a first interface adapted to communicate with a legacy communications network and a second interface adapted to communicate with a private Internet Protocol (IP) network. The satellite also includes a server having logic adapted to receive a call via the first interface. The call is placed to a first mobile communications device accessible to a first distributed mobile architecture (DMA) server. The call is then routed to the first DMA server via the second interface, wherein the first DMA server includes a wireless transceiver to communicate with the first mobile communications device.

According to the present disclosure, one or more of the communications devices between which a communication, such as a voice communication and/or a data communication, participates in a communications network via a DMA server. A DMA server enables the deployment or expansion of a communications network to, for example, rural areas where remoteness of the area to be served or a relatively small customer base to be served make the installation of a conventional telephone system impractical or otherwise undesirable. As further described below according to embodiments of this disclosure, while one or more DMA servers may communicate with one another over a private IP network, when a private IP network is not available, the DMA servers may communicate through a plurality of DMA gateways that communicate with one another through a gateway communications network. For example, the DMA gateways may be implemented as orbiting satellites that participate in a gateway communications network that includes a satellite communications network.

In introducing the operation of DMA gateways, exemplary embodiments of DMA servers and their operation are described below.

Referring to FIG. 1, a DMA server is shown and is generally designated 100. As illustrated in FIG. 1, the DMA server 100 includes a base 102 and a lid 104. As shown, the lid 104 is attached to the base by a first lid hinge 106 and a second lid hinge 108. In a particular embodiment, the lid 104 can be rotated about the first lid hinge 106 and the second lid hinge 108 between an open position, shown in FIG. 1, and a closed position (not shown) in which the lid 104 overlays the base 102 and the DMA server 100 is essentially shaped like a box or a briefcase.

As indicated in FIG. 1, the base 102 has a length 110, a width 112 and a height 114. FIG. 1 shows that the DMA server 100 includes a keyboard input device 116 that is incorporated in an upper surface of the base 102. Further, the DMA server 100 includes a mouse input device 118 that is also incorporated into the upper surface of the base 102. In a particular embodiment, the mouse input device 118 is a touch mouse input device 118. Additionally, the DMA server 100 includes a left side button 120 and a right side button 122. In a particular embodiment, the left side button 120 can be used to perform left-click functionality associated with the mouse input device 118. Moreover, the right side button 122 can be used to perform right-click functionality associated with the mouse input device 118.

FIG. 1 further indicates that the base 102 of the DMA server 100 is formed with a vent 124 to permit air exchange with the interior of the base 102 of the DMA server 100 and to facilitate cooling of the electronic components of the DMA server 100 housed within the base 102. Moreover, the base 102 of the DMA server 100 includes a handle 126 that is attached to the base 102 via a first handle hinge 128 and a second handle hinge 130. The base 102 also includes a pair of latch engagement notches 132.

As shown in FIG. 1, the lid 104 includes a flat panel display 134 incorporated therein. When the lid 104 is closed, the display 134 is adjacent to the keyboard 116. Moreover, when the lid 104 is closed, the lid 104 and the base 102 cooperate to protect the display 134, the keyboard 116, the mouse 118, and the buttons 120, 122. FIG. 1 also depicts a latch 136 that is incorporated into the lid 104. When the lid 104 is closed, the latch 136 can engage the latch engagement notches 132 in order to lock the lid in the closed position. As depicted in FIG. 1, an antenna 138 is incorporated into the lid 104. The antenna 138 can be extended during operation and retracted when the DMA server 100 is not operating.

In a particular embodiment, the length 110 of the base 102 is 31.0 centimeters. Further, in a particular embodiment, the width 112 of the base 102 is 25.5 centimeters. Additionally, in a particular embodiment, the height 114 of the base 102 with the lid 104 in the closed position is 7.0 centimeters. Accordingly, the DMA server 100 has a total volume of 5,533.5 centimeters cubed and a footprint area of 790.5 centimeters squared. Further, in a particular embodiment, the DMA server 100 weighs approximately 5.8 kilograms (kg). As such, in a particular embodiment, the DMA server 100 has a total volume that is less than 6,000 centimeters cubed, a footprint area that is less than 800 centimeters squared, and a weight that is less than 6.0 kilograms.

In a particular embodiment, the DMA server 100 is relatively rugged. Particularly, the DMA server 100 is operable in a temperature range from negative twenty degrees Celsius to positive fifty-five degrees Celsius (−20° C. to 55° C.). Also, the DMA server 100 is substantially shock resistant and can withstand a one meter drop. Further, the DMA server 100 is substantially weather resistant, substantially dust resistant, and substantially sand resistant. The DMA server 100 is portable and it can be mounted in a vehicle or carried like a brief case. Further, multiple DMA servers 100 can be deployed as described herein.

Figure 2:
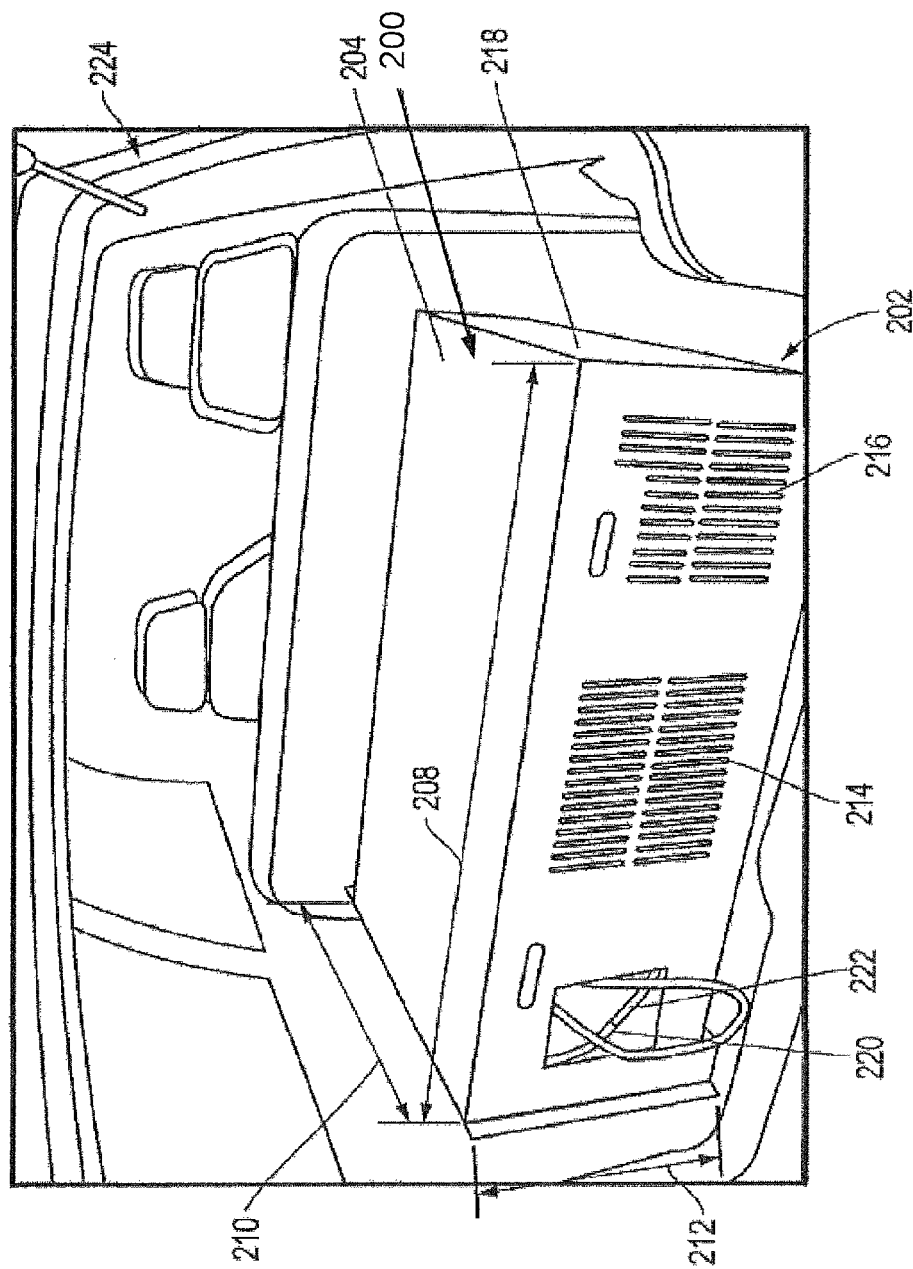
FIG. 2 is a view of another particular illustrative embodiment of an alternative embodiment of a DMA server having a second illustrative form factor.

FIG. 2 depicts an alternative embodiment of a distributed mobile architecture (DMA) server that is generally designated 200. As shown in FIG. 2, the DMA server 200 includes a base 202 and a lid 204 that is coupled to the base 202 via a plurality of fasteners (not shown). Additionally, the DMA server 200 has a length 208, a width 210, and a height 212. Further, the base 202 of the DMA server 200 includes a first vent 214, a second vent 216, and a third vent 218. In a particular embodiment, the vents 214, 216, 218 permit air exchange with the interior of the base 202 of the DMA server 200 and facilitate cooling of the electronic components of the DMA server 200 housed within the base 202. As shown in FIG. 2, the DMA server 200 includes an access window 220. One or more interfaces 222, e.g., wires can be accessed via the access window 220 and coupled to a base transceiver station (BTS) during deployment of the DMA server 200. As shown in FIG. 2, the DMA server 200 can be mounted within a vehicle 224. Further, multiple DMA servers 200 can be deployed as described herein.

In a particular embodiment, the length 208 of the base 202 is 92.0 centimeters. Further, in a particular embodiment, the width 210 of the base 202 is 45.0 centimeters. Additionally, in a particular embodiment, the height 212 of the base 202 is 34.0 centimeters. Accordingly, the DMA server 200 has a total volume of approximately 140,760 centimeters cubed and a footprint area of approximately 4,140 centimeters squared. Further, in a particular embodiment, the DMA server 200 weighs approximately 48 kilograms (kg). As such, in a particular embodiment, the DMA server 100 has a total volume that is less than 150,000 centimeters cubed, a footprint area that is less than 5,000 centimeters squared, and a weight that is less than 50.0 kilograms.

Figure 3:
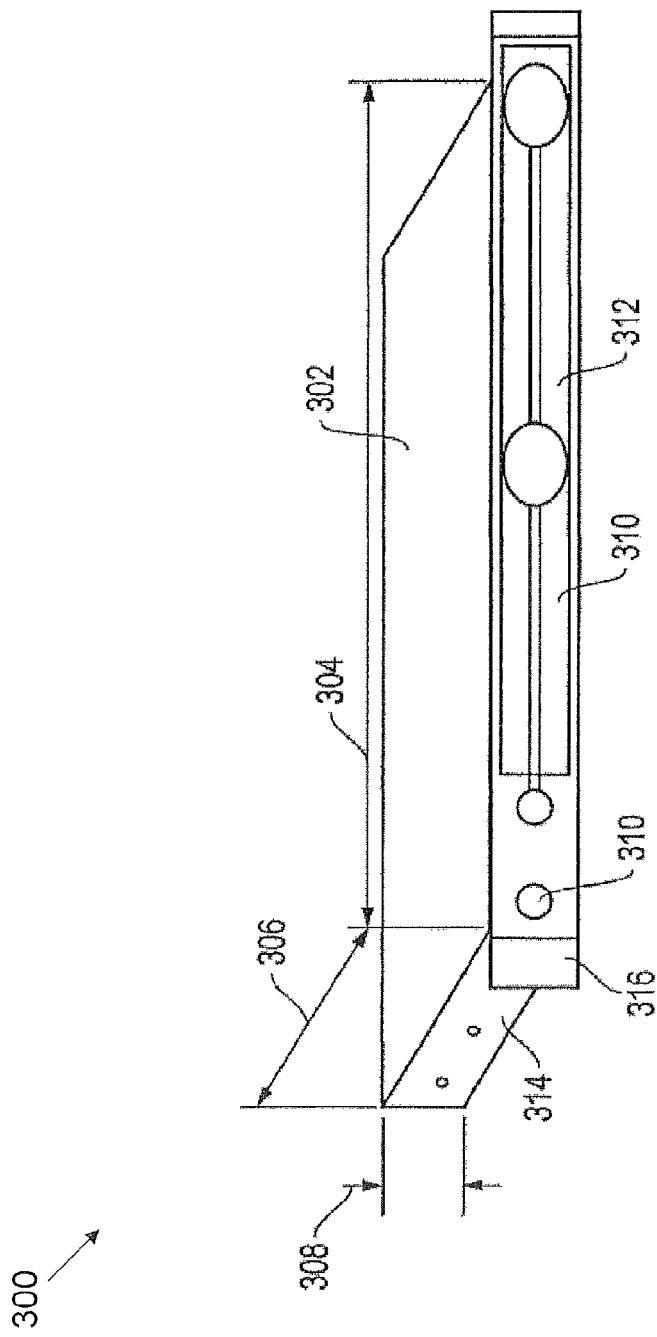
FIG. 3 is a diagram of another particular illustrative embodiment of an alternative embodiment of a DMA server having a third illustrative form factor.

FIG. 3 illustrates another alternative embodiment of a distributed mobile architecture (DMA) server that is generally designated 300. As depicted in FIG. 3, the DMA server 300 includes a housing 302 that has a length 304, a width 306, and a height 308. Additionally, the housing 302 can be formed with a first vent 310 and a second vent 312. In a particular embodiment, the vents 310, 312 permit air exchange with the interior of the housing 302 of the DMA server 300 and facilitate cooling of the electronic components of the DMA server 300 within the housing 302.

As shown in FIG. 3, at least one side of the housing 302 is formed with a rib 314 to enable the DMA server 300 to be slid into a server rack (not shown). Further, the DMA server 300 includes a clip 316 that is coupled to the housing 302 via a fastener, e.g., a bolt. The clip 316 can be engaged with a server rack (not shown) to prevent the DMA server 300 from unintentionally sliding out of the server rack (not shown).

In a particular embodiment, the length 304 of the housing 302 is approximately 76.2 centimeters. Further, in a particular embodiment, the width 306 of the housing 302 is approximately 48.2 centimeters. Additionally, in a particular embodiment, the height 308 of the housing 302 is approximately 4.3 centimeters. Accordingly, the DMA server 300 has a total volume of approximately 15,756.5 centimeters cubed and a footprint area of approximately 3,672.9 centimeters squared. Further, in a particular embodiment, the DMA server 300 weighs approximately 17.7 kilograms (kg). Also, in a particular embodiment, the DMA server 300 is stackable in order to support various capacity requirements. As such, in a particular embodiment, the DMA server 100 has a total volume that is less than 16,000 centimeters cubed, a footprint area that is less than 4,000 centimeters squared, and a weight that is less than 20.0 kilograms.

The description of embodiments of DMA servers with reference to FIGS. 1-3 are provided for illustration, not limitation. DMA servers also may be embodied in any other suitable form. For example, as described further below, a DMA server may be incorporated within an orbiting satellite that communicates with DMA gateways and other devices via satellite and ground-based communication networks.

Figure 4:
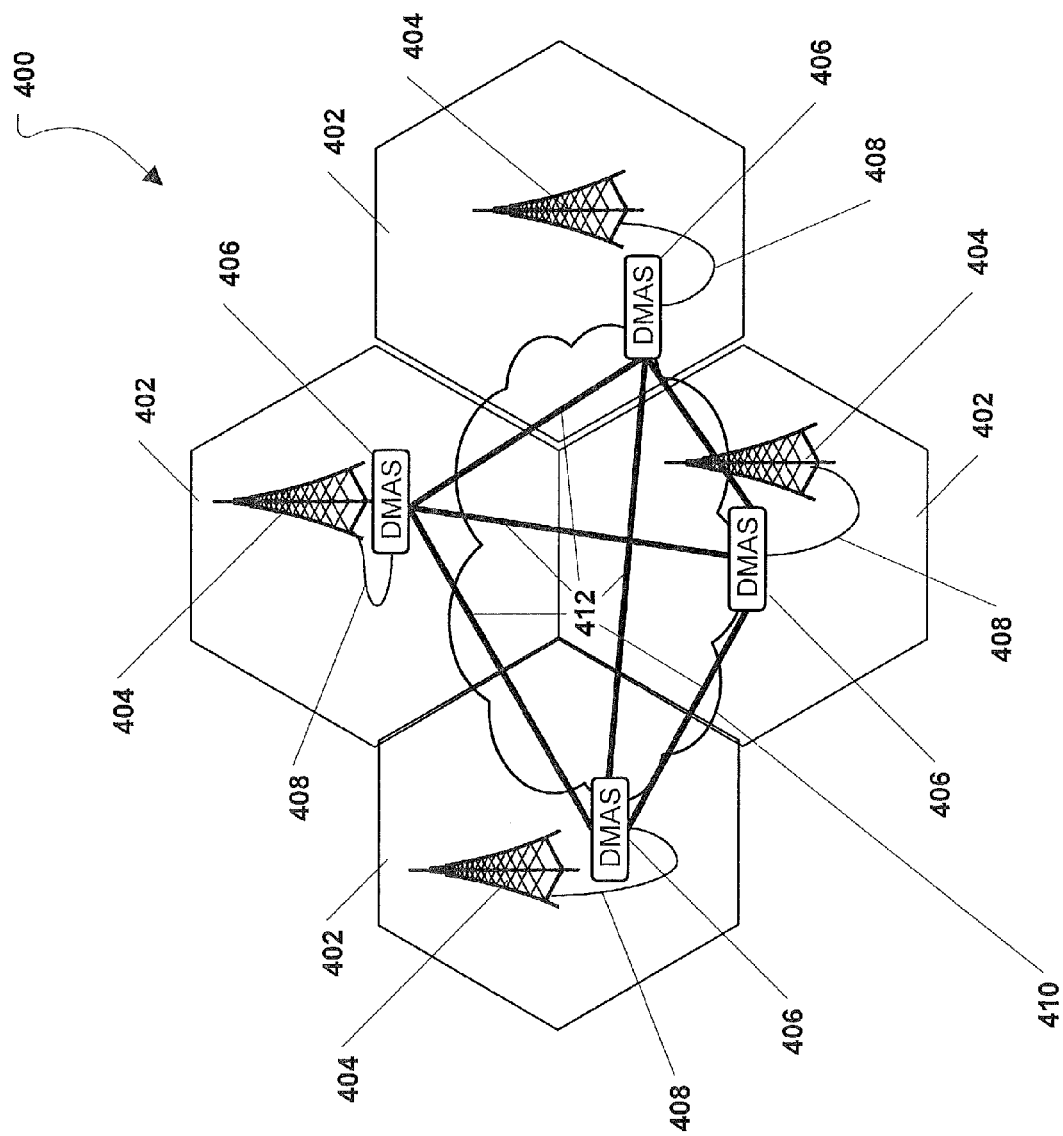
FIG. 4 is a diagram of a particular illustrative embodiment of a distributed and associative communications system.

FIG. 4 illustrates a non-limiting, exemplary embodiment of a distributive and associated telecommunications system generally designated 400. As depicted in FIG. 4, the system 400 includes four cellular coverage sites 402. Each coverage site 402 includes an antenna 404. In one embodiment, the antenna 404 is connected to a transceiver belonging to a base transceiver station (BTS) and the BTS is a 3-sector BTS. FIG. 4 also indicates that a distributed mobile architecture (DMA) server 406 (abbreviated in FIG. 4 and figures as "DMAS") can be connected to each antenna 404. In one embodiment, each DMA server 406 is physically and directly connected to its respective antenna 404, e.g., by a wire or cable 408. Further, in an illustrative embodiment, the DMA servers 406 can be any of the DMA servers shown in FIG. 1, FIG. 2, and FIG. 3.

As illustrated in FIG. 4, each DMA server 406 is interconnected with the other DMA servers 406 via an Internet protocol network 410. As such, there exists a peer-to-peer connection 412 between each DMA server 406 in the system 400. As described in detail below, the DMA servers 406 can handle telephony traffic that is communicated at each antenna 404. For example, the DMA servers 406 can switch and route calls received via each antenna 404. Additionally, the DMA servers 406 can hand-off calls to each other as mobile communications devices move around and between the cellular coverage sites 402. The DMA servers 406 can communicate with each other via the IP network 410 and can further transmit calls to each other via the IP network 410. It should be understood that more than four cellular coverage sites 402 can be included in the system and that the inclusion of only four cellular coverage sites 402 in FIG. 4 is merely for clarity and explanation purposes.

Within the distributed and associative telecommunications system 400 the controlling logic can be distributed and de-centralized. Moreover, the wireless coverage provided by the disclosed system 400 is self-healing and redundant. In other words, due to the interconnectivity via the IP network 410, if one or more of the DMA servers 406 loses powers, fails, or is otherwise inoperable, telephony traffic handled by the inoperable DMA server 406 can be re-routed to one of the remaining operable DMA servers 406. Additionally, user data stored in a database, e.g., a home location register (HLR) or a visitor location register (VLR), can be distributed equally and fully among all of the DMA servers 406. It can also be appreciated that new cellular coverage sites can be easily added to the system 400 as the demand for users increases. Specifically, a DMA server can be deployed as described below, connected to an antenna, connected to the IP network, and activated to provide cellular coverage in a new area.

Figure 5:
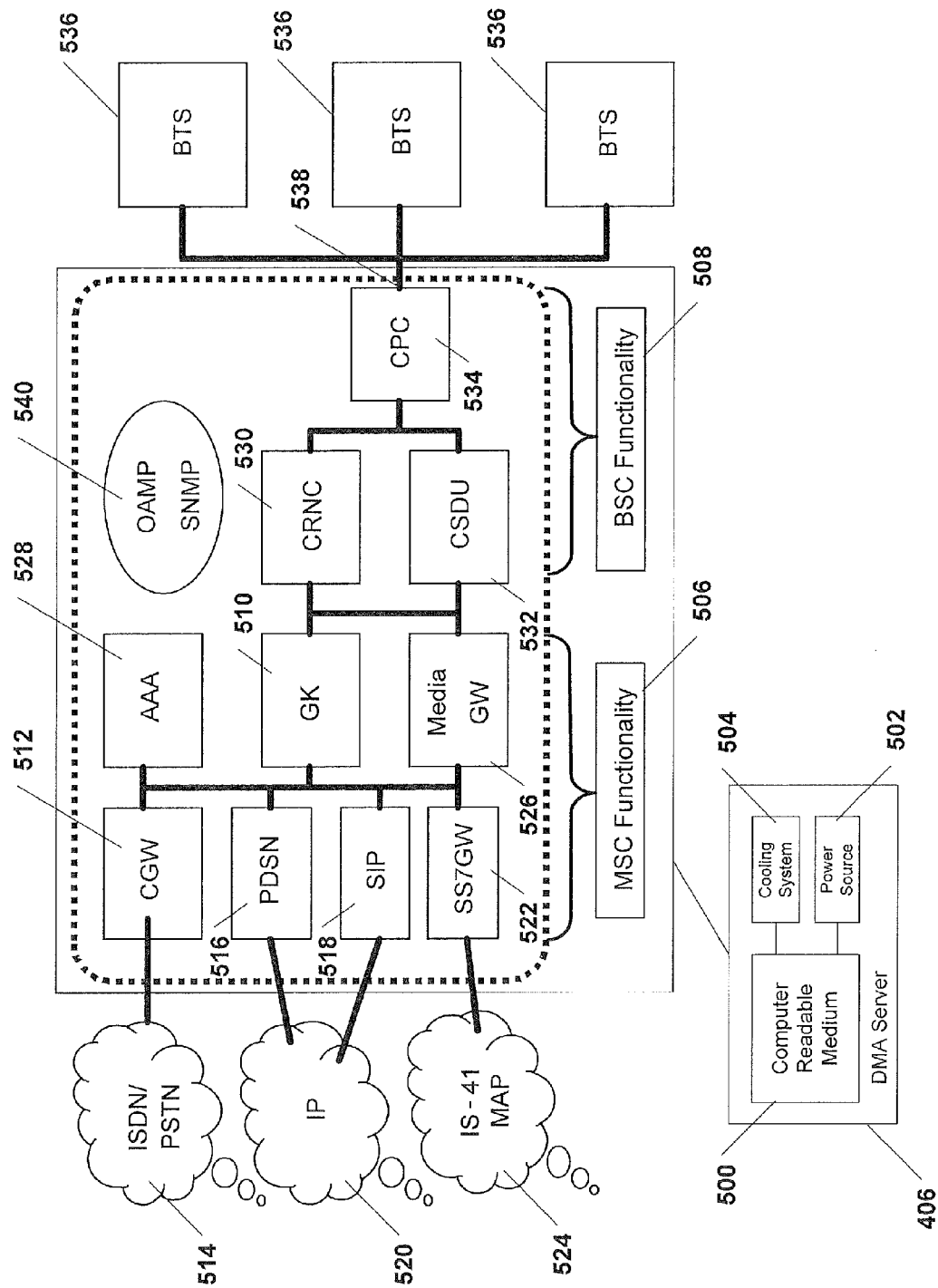
FIG. 5 is a block diagram of a particular illustrative embodiment of a DMA server.

FIG. 5 shows an exemplary, non-limiting, detailed embodiment of a DMA server, e.g., one of the DMA servers 406 described in conjunction with FIG. 4. Further, any of the DMA servers 100, 200, 300 shown in FIG. 1, FIG. 2, and FIG. 3 can include the components depicted in FIG. 5 and described herein.

In a particular embodiment, the DMA server 406 is essentially a processor, or computer, having a housing and a computer readable medium 500 that is disposed therein. A power supply 502 can also be disposed within the housing of the DMA server 406 in order to provide power to the DMA server 406. The power supply 502 can be a rechargeable battery disposed within the DMA server 406 or it can be external to the DMA server 406, i.e., a standard power outlet. Moreover, a cooling system 504, e.g., a fan with a thermostat, can be within the DMA server 406 in order to keep the DMA server 406 from overheating. In an alternative embodiment, the DMA server 406 can be a single board processor that does not require a fan.

As depicted in FIG. 5, the DMA server 406 may include a mobile switching center (MSC) module 506 and a base station controller (BSC) module 508 embedded within the computer readable medium 500. In an exemplary, non-limiting embodiment, the MSC module 506 can include a gatekeeper (GK) 510 that is connected to several gateways. For example, a circuit gateway (CGW) 512 can be connected to the GK 510 and can provide connectivity to an integrated services digital network/public switched telephone network (ISDN/PSTN) interface 514. The CGW 512 can provide a circuit switched to packet data conversion. In an exemplary, non-limiting embodiment, the PSTN portion of the ISDN/PSTN interface 514 can be an inter-office interface that uses the Bellcore industry standard ISDN user part (ISUP) signaling on a signaling system seven (SS7) link set. Moreover, the voice trunks on this interface can be timeslots on a T1 connection. Inbound and outbound voice calls can be supported on the ISDN portion of the ISDN/PSTN interface 514.

As further illustrated in FIG. 5, a packet data server node (PDSN) gateway 516 for CDMA, or a Gateway GPRS Support Node (GGSN) for Global System for Mobile Communication (GSM), and a Session Initiation Protocol (SIP) gateway 518 can also be connected to the GK 510. The PDSN gateway 516 and the SIP gateway 518 can provide connectivity to an IP interface 520. Further, the PDSN gateway 516 or a GGSN can establish a reverse tunnel with the PDSN or GGSN gateway 516 using generic routing encapsulation (GRE). Moreover, the PDSN gateway 516, or GGSN, can implement the Pseudo Random Function (PRF)/Foreign Agent (FA) functionality of the DMA server 406 which supports mobile IP functions.

FIG. 5 further shows an SS7 gateway 522 that provides connectivity to an American National Standards Institute 41 (ANSI-41) and GSM Mobile Application Part (MAP) interface 524. In a particular embodiment, the ANSI-41 interface can be an SS7 TCAP/SCCP interface on the same SS7 link set used for ISUP signaling. The same SS7 point code can be used to identify the DMA server 406 in the ANSI-41 network. The ANSI-41 interface can be used for roamer registration. Further, in an exemplary, non-limiting embodiment, the GSM MAP interface can be an SS7 TCAP/SCCP interface on the same SS7 link set used for ISUP signaling. It can be appreciated that there are different protocols of MAP from MAP/B to MAP/I, but in the illustrative embodiment, the different MAP/x protocols are not stacked—they are used independently. As described with reference to FIG. 11, the SS7 interface may be included in either the DMA server 406 or the DMA gateway 1102.

As depicted in FIG. 5, a media gateway 526 can also be coupled to the GK 510. In an exemplary, non-limiting embodiment, the media gateway 526 can include cellular transcoders, one or more intranet gateways, conferencing bridges, and group calling functionality. Further, an authentication, authorization, and accounting (AAA) module 528 can be coupled to the GK 510. In an exemplary, non-limiting embodiment, there are three levels of authentication management. The highest level is for administration, the mid-level is for operations, and the lowest level is for normal users. The functions of the AAA module 528 can be included in the user level.

In an exemplary, non-limiting embodiment, the GK 510 can act as an AAA server and a feather server to support advanced supplementary service, short message service, etc. Moreover, the GK 510 can act as a call manager and can support ISUP and PSTN function calls. Additionally, the GK 510 can act as a signal gateway, e.g., IP to SS7 inter-working, ISUP, GSM MAP or ANSI-41 to PSTN and ANSI-42/GSM. The GK 510 can also function as a data call server.

As illustrated in FIG. 5, the BSC module 508 includes a cellular radio network controller (CRNC) 530 and a cellular selection/distribution unit (CSDU) 532 that are connected to a call protocol controller (CPC) 534. In turn, the CPC 534 can be connected to a plurality of base transceiver stations (BTSs) 536. Specifically, the DMA server 406 includes a BTS interface 538 at the CPC 534 that can be physically and directly connected to the BTSs 536. The CRNC 530 can provide cellular radio resource management and cellular call control. The CSDU 532 can provide Fundamental Channel (FCH) soft handoff and distribution, Link Access Control (LAC) processing for inband signaling, multiplexer (MUX) functions, and centralized power control. Further, the CPC 534 can convert a T1 or E1 message or ATM interface to a data packet message. In a particular embodiment, each BTS 536 supports signals and traffic up to the front point of the CPC 534, e.g., up to the BTS interface 538. Further, in a particular embodiment, the CRNC 530, the CPC 534, the CSDU 532 and the OAMP 540 can perform one or more of the functions of legacy Base Station Controllers (BSC).

In an exemplary, non-limiting embodiment, the BTS interface 538 can be an IS-95A OR IS-2000 interface over E1 or ATM, or the BTS interface 538 can be a GSM BTS interface using MAP or customized application for mobile network enhanced logic (CAMEL). In an illustrative embodiment, the CPC 534 can be connected to one or more BTSs 536. FIG. 5 further shows that the BSC module 508 includes an operations, administration, maintenance, and provisioning (OAMP) module 540. In an exemplary, non-limiting embodiment, the OAMP module 540 can use simple network management protocol (SNMP) for operations interfaces. Further, the OAMP module 540 can include a JAVA user interface. The OAMP module 540 can also include a software agent that is assigned to each component within the DMA server 406. The agents independently monitor their respective components. Moreover, each agent can provision its respective component.

When deployed in a network, such as illustrated in FIG. 4, embodiments of DMA servers are configured to handle the handing off of communications when, for example, a mobile device passes from a coverage site 402 (FIG. 4) covered serviced by one DMA server 406 to another coverage site 402 serviced by another DMA server 406. As previously described, the DMA servers 406 participate in an IP network 410 through which the communications are routed between the DMA servers 406. However, in not all cases will the DMA servers 406 be able to participate as peers in an IP network 410. For example, if one or more of the coverage sites 402 are in rural locations or other locations remote from other coverage sites 402, there may not be access to the IP network 410 in the remote coverage sites 402. Accordingly, embodiments of the present disclosure describe DMA gateways to enable DMA servers to communicate with one another when one or more of the DMA servers cannot participate directly in the IP network. In addition, embodiments of the DMA gateways also enable legacy networks and devices participating in the legacy networks to communicate with devices serviced by one or more of the DMA servers as further described below.

Because of the mobility of various forms of the DMA servers and devices that may communicate via these servers, as well as the DMA gateways described below, the communications network accounts for the movement of these devices. In other words, as the devices move, information regarding the accessibility of these devices and how communications are routed among them is dynamic. Thus, even when such devices move during the course of a communication, information pertaining to the routing of the communication is updated to support continuation of the communication.

Figure 6:
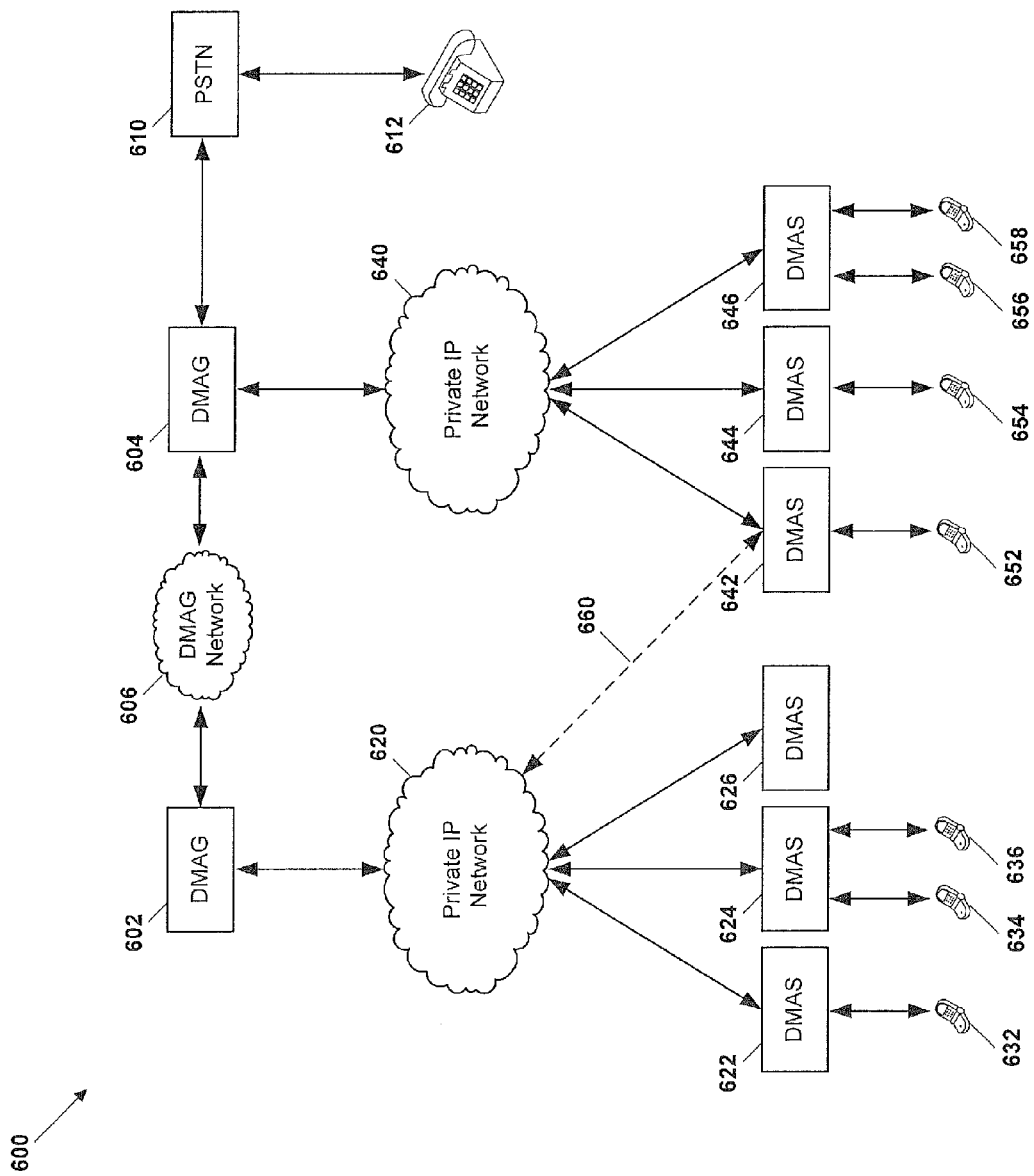
FIG. 6 is a diagram of a particular illustrative embodiment of a network incorporating a plurality of DMA gateways linking a plurality of DMA servers and a legacy network.

FIG. 6 illustrates a network 600 that includes a first DMA gateway (abbreviated as "DMAG" in FIG. 6 and other figures) 602 and a second DMA gateway 604 that communicate with each other over a DMA gateway network 606. The DMA gateway network 606 may include a dedicated wired or wireless communication medium or be included within a network carrying other communications. The second DMA gateway 604 communicates with a legacy network that, for example, includes a public switched telephone network 610 that services communication with wired, landline devices such as landline telephone 612. The DMA gateway also may enable communication with public IP networks that enable data communications, Voice over Internet Protocol (VoIP) communications, and other communications, as well as other types of legacy networks. Although a pair of DMA gateways 602 and 604 and a single legacy network 610 are shown in FIG. 6, any number of DMA gateways and legacy networks may participate in the network 600.

In addition to the DMA gateways 602 and 604 and the legacy network 610, the network 600 includes two groups of DMA servers in which the DMA servers communicate with each other over separate private IP networks. For example, in a first group communicating via a first private IP network 620, three DMA servers 622, 624, and 626 communicate with each other. In a second group communicating via a second private IP network 640, three DMA servers 642, 644, and 646 communicate with each other. Two different groups each including three DMA servers are shown for illustration. However, it will be appreciated that any number of groups of DMA servers could communicate with each other within each of the groups, and any number of groups could be bridged using DMA gateways as described below to enable communications between devices associated with different DMA servers in different groups.

Each of the DMA servers may service a plurality of voice and/or data communications devices. For example, a first DMA server 622, through an associated wireless transceiver, may service a plurality of communications devices such as a first wireless telephone device 632. As previously described with reference to FIG. 4, the first wireless telephone device 632 may communicate with devices serviced by other DMA servers that participate in the first private IP network 620.

Thus, for example, the first wireless telephone device 632 would be able to engage in voice and/or data communications with a second wireless telephone device 634 serviced by a second DMA server 624. Also, it should be appreciated that the second wireless telephone device may communicate with other devices, such as a third wireless telephone device 636 that is serviced by a same DMA server, such as the second DMA server 624. Although the DMA servers in FIG. 6 are only shown servicing wireless telephone devices, it should be appreciated that other devices, such as computers and other communication devices also may participate in the network 600 by communicating through the DMA servers.

As shown in FIG. 6, the groups of DMA servers communicating via the two private IP networks 620 and 640 are separate networks. The wireless telephone devices 632, 634, and 636 serviced by DMA servers 622 and 624 participating in the first private IP network 620 do not have a network connection with any of the DMA servers 642, 644, and 646 that communicate with each other via the second private IP network. Thus, a fourth wireless telephone device 652 in communication with a fourth DMA server 642 can communicate with a fifth wireless telephone device 654 serviced by a fifth DMA server 644 because the DMA servers 642 and 644 can communicate with each other via the second private IP network 640. Similarly, the sixth wireless telephone device 656 and the seventh wireless telephone device 658 can communicate with each other through the sixth DMA server 646 with which each communicates and each can communicate with the other wireless telephone devices 652 and 654 serviced by the other DMA servers 642 and 644 participating in the second private IP network. However, without a bridge between the first private IP network 620 and the second private IP network 640, neither the DMA servers nor the wireless telephone devices serviced by each of the private IP networks 620 and 640 can communicate with devices serviced by the other private IP network. Similarly, neither the DMA servers nor the wireless telephone devices serviced by each of the private IP network 620 and 640 can communicate with the public switched telephone network 610 or any of the devices, such as the landline telephone device 612, serviced by the public switched telephone network 610.

Embodiments of the present disclosure enable devices on separate networks to communicate with each other via DMA gateways that bridge separate network and communications systems. In the example of FIG. 6, the first private IP network 620 communicates with the first DMA gateway 602 and the second private IP network 640 communicates with the second DMA gateway 604. The DMA gateways 602 and 604 are configured to route communications from one private IP network to another and the DMA gateways 602 and 604 are in communication with each other via the DMA gateway network 606. As a result, the DMA gateways 602 and 604 can route communications from the DMA servers 622, 624, and 626 and the devices they service to the DMA servers 642, 644, and 646 and the devices they service and vice versa. Also, because the second DMA gateway is coupled with the second public switched telephone network 640, the wireless telephone devices 652, 654, 656, and 658 and other devices serviced by the DMA servers 642, 644, and 646 can communicate with the landline telephone device 612 and other devices serviced by the public switched telephone network 610. In short, the DMA gateways can provide communications between wireless devices serviced by associated DMA servers and wired or wireless devices serviced by legacy networks coupled with the DMA gateways.

To facilitate communications between devices serviced by different networks, the DMA gateways 602 and 604 maintain information identifying the devices that each services. For example, when the first wireless telephone device 932 initiates a communication to the fourth wireless telephone device 952, the first DMA gateway 602 accesses data identifying what other DMA gateway, if any, services the fourth wireless telephone device and which DMA server or other network or device associated with the first DMA gateway services the targeted fourth wireless telephone device 952. DMA gateways provide information to one another regarding the communications networks they service by exchanging register data describing the networks they service. The register data describes devices for which the networks they service are the home network as well as for what devices are visiting on their networks. This information is exchanged directly between the DMA gateways or through a central database described further below with reference to FIG. 10.

A DMA server may associate itself with different DMA gateways. For example, as described with reference to FIGS. 1 and 2, a DMA server may include a mobile device that is easily moved from one place to another. A mobile DMA server that communicates wirelessly with a private IP network and the DMA gateway servicing that private IP network may move out of communications range of a DMA gateway with which it was previously associated into communications range with another DMA gateway. For further example, for purposes of traffic management, fault tolerance, or other reasons, it may be desirable to reassociate a DMA server previously associated with one DMA gateway to another DMA gateway. This reassociation may be initiated manually or automatically by the DMA server, the DMA gateway, or any combination thereof. Thus, for example, the fourth DMA server 642 may be reassociated with the first private IP network 620 and the first DMA gateway 602 servicing the first private IP network 620 as shown by the dashed line 660 in FIG. 6. Because the DMA gateways 602 and 604 bridge the private IP networks 620 and 640, devices serviced by the fourth DMA server 642, such as the fourth wireless telephone device 652 may continue to communicate with the wireless telephone devices 654, 656, and 658 serviced by the DMA servers 644 and 646 associated with the second private IP network 640.

Figure 7:
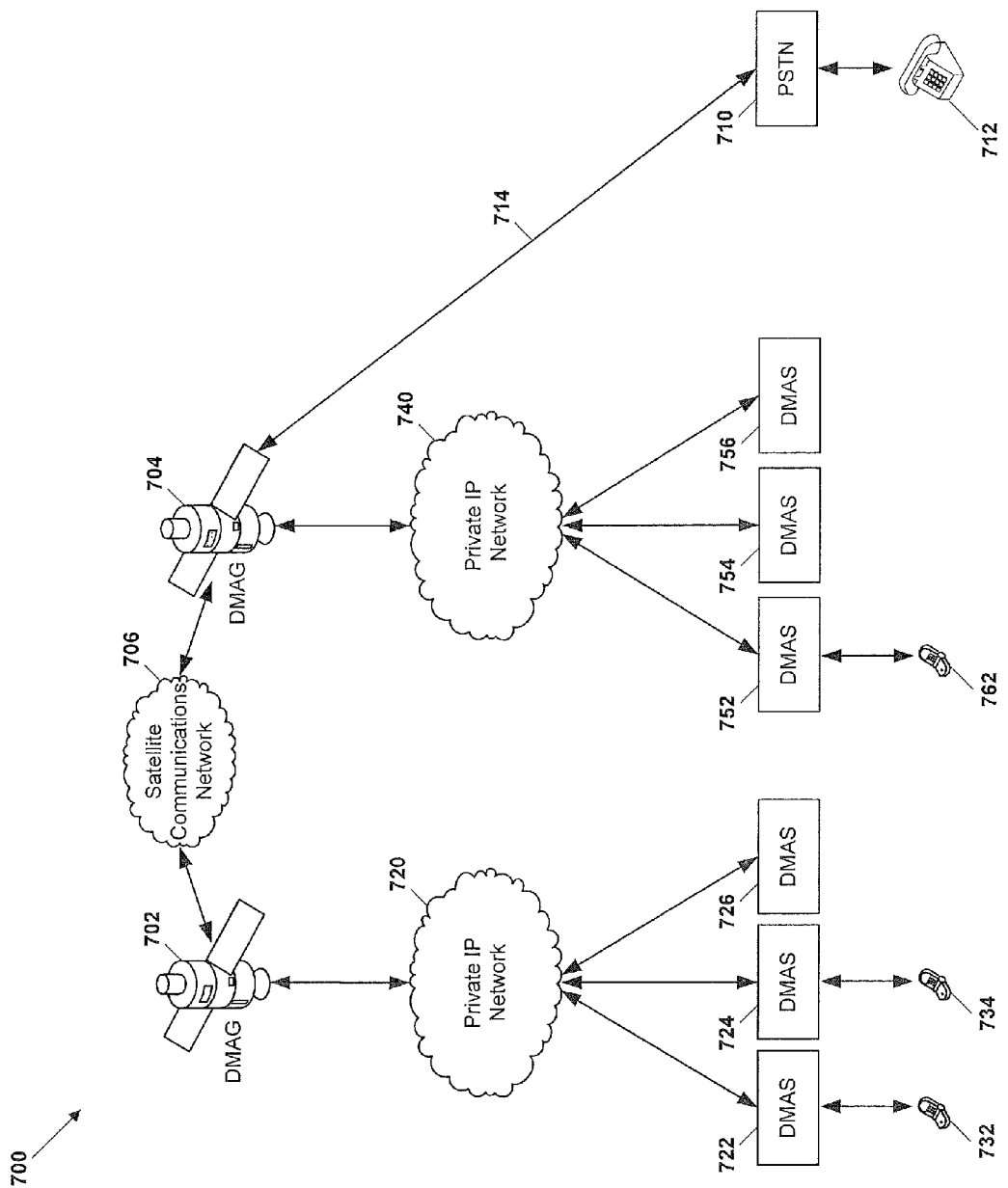
FIG. 7 is a diagram of a particular illustrative embodiment of a network incorporating a plurality of satellite-based DMA gateways linking a plurality of DMA servers and a legacy network.

The DMA gateways and DMA servers can be arrayed in any number of ways to facilitate the deployment and proliferation of communications networks. For example, FIG. 7 illustrates a network 700 that includes satellite-based DMA gateways including a first satellite-based DMA gateway 702 and a second satellite-based DMA gateway 704. The satellite-based DMA gateways 702 and 704 are placed in orbits suitable to enable communications with ground-based private IP networks 720 and 740 and a ground-based legacy network 710. The satellite-based DMA gateways 702 and 704 communicate with each other via a satellite communications network 706. The second satellite-based DMA gateway 704 communicates with a legacy network, such as a public switched telephone network 710, over a communications uplink 714 via the same satellite communications network 706 through which the satellite-based DMA gateways 702 and 704 communicate or another uplink communications medium. The satellite-based DMA gateways 702 and 704 communicate with private IP networks 720 and 740 that may include ground-based private IP networks, via the same satellite communications network 706 or other uplink communications media. An advantage of including satellite-based DMA gateways is the ability to bridge DMA servers or groups of DMA servers with one another even though the DMA servers or groups of DMA servers may be disposed remotely from each other where ground-based DMA gateways or ground-based communications media between the DMA servers are overtaxed, unreliable, unavailable, or otherwise undesirable.

Using the satellite-based DMA gateways 702 and 704, communications between the DMA servers, the devices they serve, and the legacy network operates in a similar manner to the communications between devices as described with reference to FIG. 6. A first group of DMA servers 722, 724, and 726 communicate via a first private IP network 720. A first wireless telephone device 732 in communication with a first DMA server 722 is able to communicate with a second wire telephone device 734 in communication with a second DMA server 724 via the first private IP network 720. Further, the first wireless telephone device 732 is enabled, via the first DMA server 722 and the first private IP network 720, to communicate with the first DMA gateway 702. Then, via the satellite communications network 706, the first DMA gateway 702 is able to communicate with the second DMA gateway 704 to enable communications with devices served by the second private IP network 740. Thus, the DMA gateways 702 and 704 allow the first wireless telephone device 732 to communicate with a third wireless telephone device 762 even though the wireless telephone devices 732 and 762 participate in separate private IP networks 720 and 740. In addition, because the second DMA gateway 704 is in communication with both the second private IP network 740 and the public switched telephone network 710, the second DMA gateway 704 enables mobile-to-land communications between third wireless telephone device 762 and a wired landline device 712. The use of satellite-based DMA gateways 702 and 704 enables this communication even as vast distances separate the communication devices and there are little or no land-based communications networks between the devices.

Figure 8:
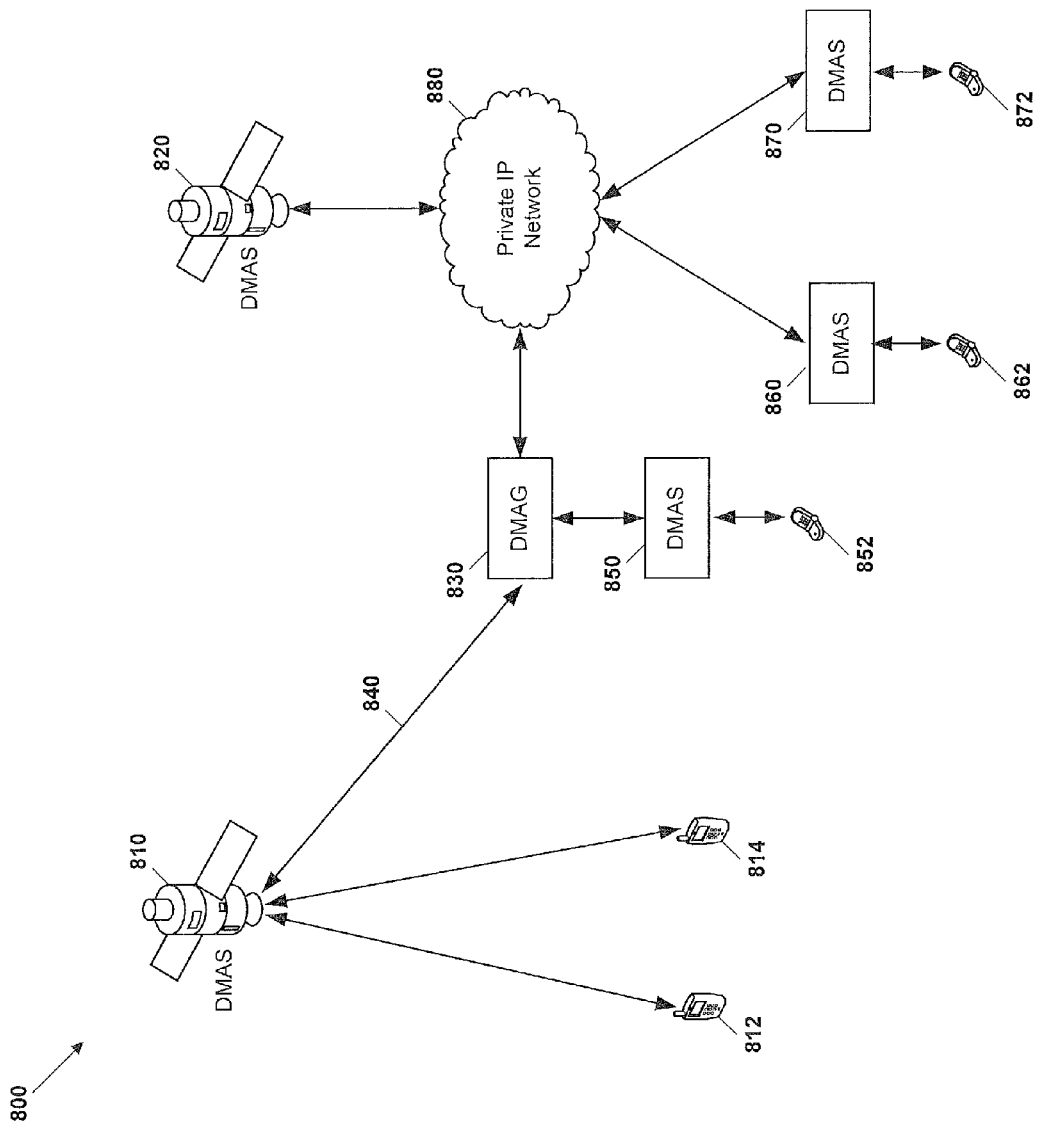
FIG. 8 is a diagram of a particular illustrative embodiment of a network incorporating a DMA gateway linking a plurality of satellite-based DMA servers and ground-based DMA servers.

FIG. 8 illustrates a communications network 800 in which, instead of utilizing satellite-based DMA gateways, employs a ground-based DMA gateway 830 facilitating communications between satellite-based DMA servers 810 and 820. In areas where, for example, a ground-based DMA server cannot be employed or the distance between wireless communication devices 812 and 814 is so large that one or more DMA servers may not be able to effectively service the wireless communication devices 812 and 814, it may be desirable to enable communications with the deployment of satellite-based DMA servers such as DMA servers 810 and 820. In such a case, the wireless communications devices 812 and 814 may include wireless satellite communications devices or other devices with access to a satellite uplink communications medium. As in the case of DMA servers previously described, a first wireless communications device 812 in communication with a first DMA server 810 may wirelessly communicate with a second wireless communications device 814 that is also in communication with the first DMA server 810.

In addition, because the first DMA server 810 is in communication with a ground-based DMA gateway 830 via a suitable uplink communications medium 840, the first DMA server 810 is able to route communications between the devices it serves and other devices in communication with the DMA gateway 830. For example, the DMA gateway 830 is in communication with a first ground-based DMA server 850 that services a first wireless telephone device 852. As a result, the wireless communications devices 812 and 814 are able to communicate with the first wireless telephone device 852. Similarly, the DMA gateway 830 also is in communication with a private IP network 880 that provides communications between the second satellite-based DMA server 820 and two ground-based DMA servers 860 and 870. As a result, the DMA gateway 830 enables communications between the wireless communications devices 812 and 814 serviced by the first satellite-based DMA server 810, the first wireless telephone device 852 serviced by the ground-based DMA server 850, a second wireless telephone device 862 serviced by a second ground-based DMA server 860, a third wireless telephone device 872 serviced by a third ground-based DMA server 870, and any devices (not shown in FIG. 8) serviced by the second satellite-based DMA server 820. In addition, if the DMA gateway 830 were in communication with one or more legacy networks, the DMA gateway 830 could enable communications between devices serviced by the legacy networks and devices serviced by the DMA servers 810, 820, 860, and 870 in communication with the DMA gateway 830.

Figure 9:
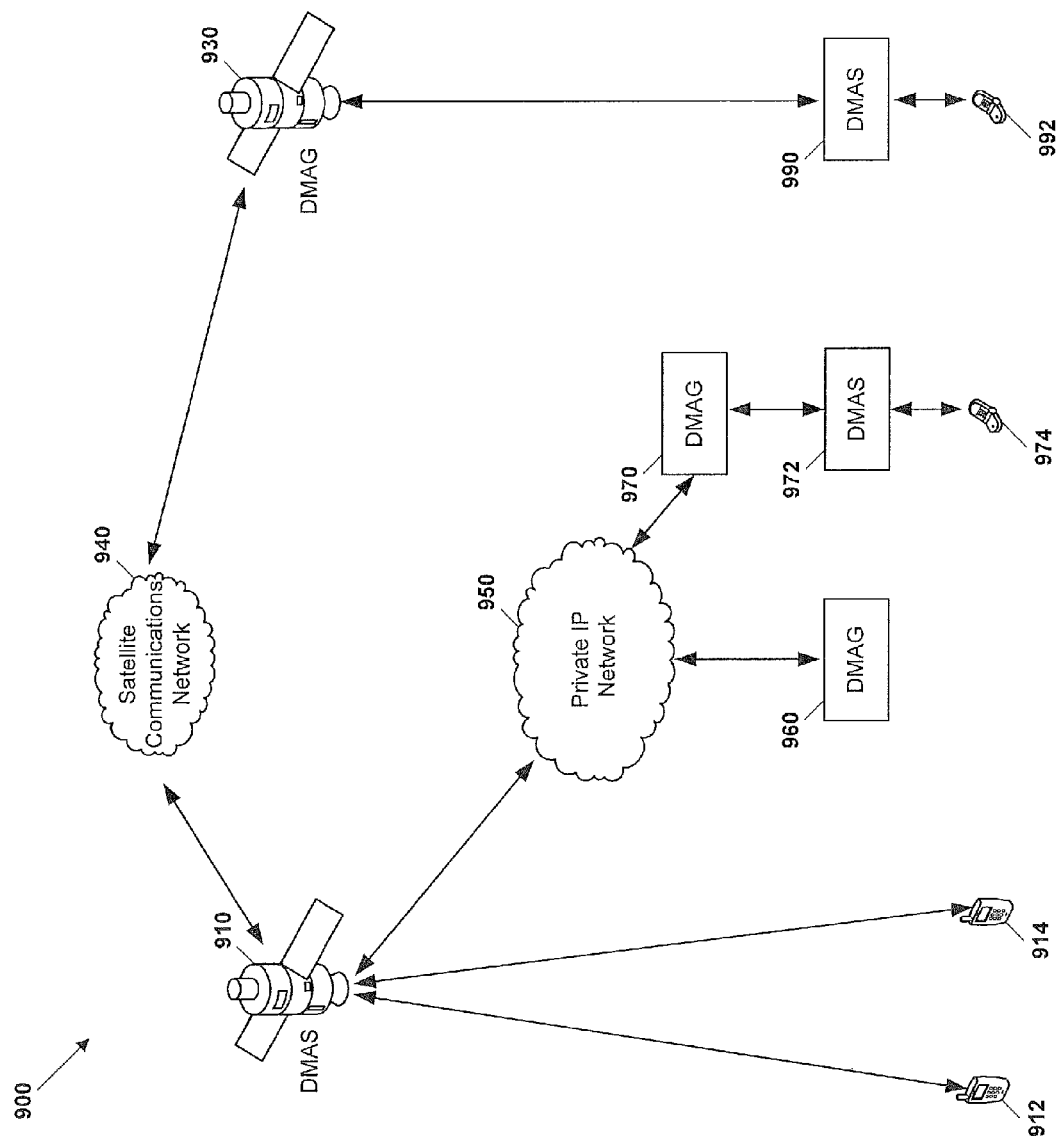
FIG. 9 is a diagram of a particular illustrative embodiment of a network incorporating a plurality of satellite-based and ground-based DMA gateways linking a plurality of satellite-based and ground-based DMA servers.

FIG. 9 illustrates a communications network 900 illustrating how a communications network may include a combination of satellite-based and ground-based DMA servers and satellite-based and ground-based DMA gateways. Embodiments of the present disclosure are not restrictive to including only ground-based or satellite-based DMA gateways or DMA servers and thus provide flexibility in creating and proliferating communications networks based on the communications needs for which the network is deployed.

A first satellite-based DMA server 910 communicates with wireless communications devices 912 and 914. The first satellite-based DMA server 910 also is in communications with a satellite communications network 940 and a private IP network 950. Via the satellite communications network 940, first the satellite-based DMA server is able to communicate with a satellite-based DMA gateway 930 to, for example, enable communications between devices served by a first ground-based DMA server, such as a first wireless telephone 992. Via the private IP network 950, the satellite-based DMA server 910 also is able to communicate with other DMA gateways, such as a first ground-based DMA gateway 960 and a second ground-based DMA gateway 970. Thus, the devices served by the satellite-based DMA server 910 would be able to communicate with devices in communication with the ground-based DMA gateways 960 and 970, such as the second wireless telephone device 974 that is serviced by a second ground-based DMA server 972 in communication with the second ground-based DMA gateway 970. In sum, as described in the particular illustrative embodiments depicted in FIGS. 6-9, satellite-based or ground-based DMA servers and satellite-based or ground-based gateways can be deployed as desired to enable communications between various communications devices.

To facilitate communications between devices serviced by different networks, the DMA gateways maintain information identifying the devices that each services. For example, a user of a wireless telephone device serviced by a first DMA server may send a communication to the user of the target wireless telephone device that is serviced by a second DMA server. The first and second DMA servers both are in communication with a DMA gateway that enables communications between the devices serviced by the different DMA servers. The DMA gateway is configured to route the communications by accessing information indicating which DMA servers provide service to which wireless devices. The DMA gateway may maintain the information locally in the DMA gateway or access information maintained in a central register accessible to the DMA gateway. When the information is maintained locally in the DMA gateway, DMA gateways in the network provide information to one another regarding the devices they service by exchanging register data describing the devices they service. The register data describes devices for which the networks they service are the home network as well as for what devices are visiting on their networks. This information is exchanged directly between the DMA gateways or through a central database described further below with reference to FIG. 10.

Figure 10:
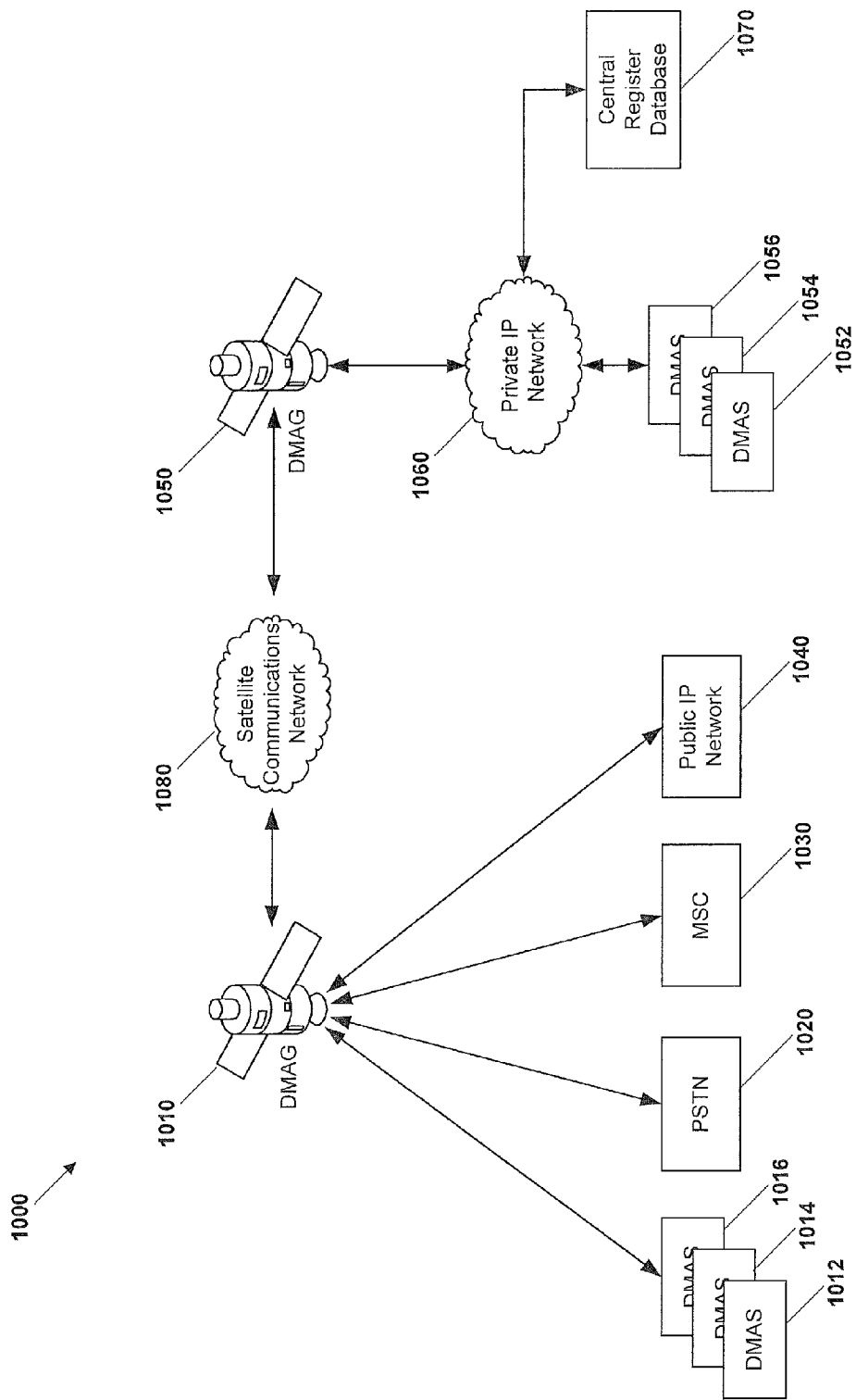
FIG. 10 is a diagram of a particular illustrative embodiment of a network incorporating a plurality of DMA gateways and a plurality of legacy networks utilizing a central register database for communications devices accessible within the network.

FIG. 10 shows a network 1000 including a pair of DMA gateways 1010 and 1050 that facilitate communications between devices on different types of networks. A first DMA gateway 1010 communicates with a plurality of DMA servers 1012, 1014, and 1016 and a plurality of legacy networks 1020, 1030, and 1040. As described below with reference to FIG. 11, the DMA gateway 1010 includes interfaces configured to communicate with a PSTN 1020, a mobile switching center (MSC) 1030 such as used by wireless telephones and communications devices, and a public IP network 1040. The DMA gateway 1010 thus permits communication between devices serviced by the DMA servers 1012, 1014, and 1016 and devices serviced by the associated legacy networks 1020, 1030, and 1040.

In addition, the DMA gateway 1010, through the satellite communications network 1080 or other DMA gateway network, communicates with other DMA gateways to support communications between the devices serviced by different DMA gateways. For example, the second DMA gateway 1050 is associated with a private IP network 1060 that services a plurality of DMA servers 1052, 1054, 1056 and the devices they serve. Thus, through the DMA gateways 1010 and 1050, devices serviced by one of the DMA servers 1012, 1014, and 1016 or devices serviced by the legacy networks 1020, 1030, and 1040, can communicate with devices serviced by the DMA servers 1052, 1054, and 1056 or other networks serviced by the second DMA gateway 1050. The private IP network 1060 also includes a central register database 1070 that maintains information serviced by DMA gateways and DMA servers within the network 1000. The operation of this central register database 1070 is described further below.

As shown in FIG. 10, one or more of the DMA servers 1012, 1014, and 1016 may communicate directly with a respective DMA gateway, such as DMA gateway 1010, through a satellite uplink or other communications medium. Alternatively, one or other DMA servers 1052, 1054, and 1056 may communicate with a DMA gateway, such as DMA gateway 1050, via a private IP network 1060 in which the DMA servers 1052, 1054, and 1056 and the DMA gateway 1060 participate. When a DMA server communicates with a DMA gateway over a private IP network, the respective DMA server and DMA gateway may communicate with each other by transmitting IP packet data over the private IP network. On the other hand, when the DMA server communicates with the DMA gateway via a different medium, the DMA server and DMA gateway may communicate with each other according to the protocol of the available medium.

In the networks of FIGS. 6-10, embodiments of DMA gateways exchange communications information identifying devices serviced by one or more DMA servers or other communications networks that the DMA gateways service. When a DMA gateway detects that it is in communications range with one or more DMA servers, the DMA gateway sends communications information from the DMA servers or other communications networks to one or more other DMA gateways or to a central database, such as the central register database 1070. The communications information may include a notification of what DMA server or servers with which the DMA gateway is in communication. As DMA gateways move between communications ranges of various DMA servers or vice versa, the DMA gateways may send additional notifications or other information to update the previously-communicated communications information as to what communications networks are accessible to the various DMA gateways.

The communications information, in one embodiment, includes register information, such as home location register (HLR) information and visitor location register (VLR) information maintained by the DMA servers or other communications networks. As described with reference to FIG. 1 and FIG. 2, because a DMA server may include a portable or mobile device, the DMA server information also may identify whether the DMA gateway is a home gateway for the DMA server or whether the DMA server is temporarily registered with the DMA gateway in a visitor DMA register.

When another DMA gateway receives the DMA server information from a first DMA gateway, a second DMA gateway stores the DMA server information in a home DMA register in which the second DMA gateway also stores information regarding the devices it services. The second DMA gateway receives a communication from one of the devices it services targeted for a wireless device that is serviced by the first DMA gateway. The second DMA gateway then routes the communication via a DMA gateway network to the first DMA gateway. The first DMA gateway, using its own home DMA register storing information about the devices is services, then directs the communication to the network and/or DMA server that services the targeted communications device.

When the DMA gateway receives DMA server information about one or more DMA services associated with the DMA gateway or information about other networks the DMA gateway services, the DMA gateway may provide the DMA server information to other DMA gateways in a number of ways. For example, the DMA gateway may send a notification to other DMA gateways that is has received the DMA server information and that the DMA server information can be retrieved from the DMA gateway or, as described below, from a central database. The DMA server information is then transmitted to other DMA gateways in response to queries from one or more gateways requesting the DMA server information. Alternatively, the DMA gateway may automatically send the DMA server information to other gateways upon receiving the DMA server information.

Instead of or in addition to sending the DMA server information to other DMA gateways, the DMA gateway may send the DMA server information to a central database as shown in FIG. 10. Then, for example, when a DMAG gateway such as DMA gateway 1010 is in communications range of a DMA server such as DMA server 1012, the DMA server information is sent to the central register database 1070. The DMA server information is sent from the DMA gateway 1010 via the satellite communications network 1080 to the DMA gateway 1050 where the DMA server information is routed via the private IP network 1060 to the central register database. Thus, as DMA server networks and other networks are added to the system, the DMA gateway servicing each of these communications networks receives the communications information for the communications network and sends the communications information to the central register database 1070. Then, other DMA gateways each can receive the new communications information from the central register database 1070.

The new communications information may be automatically sent by the central register database 1070 via the DMA gateway 1050 that services the central register database. Alternatively, when new communications information is received, the DMA gateway receiving the communications information or the central register database 1070 may send a notification to other DMA gateways that the new information is available for retrieval.

Figure 11:
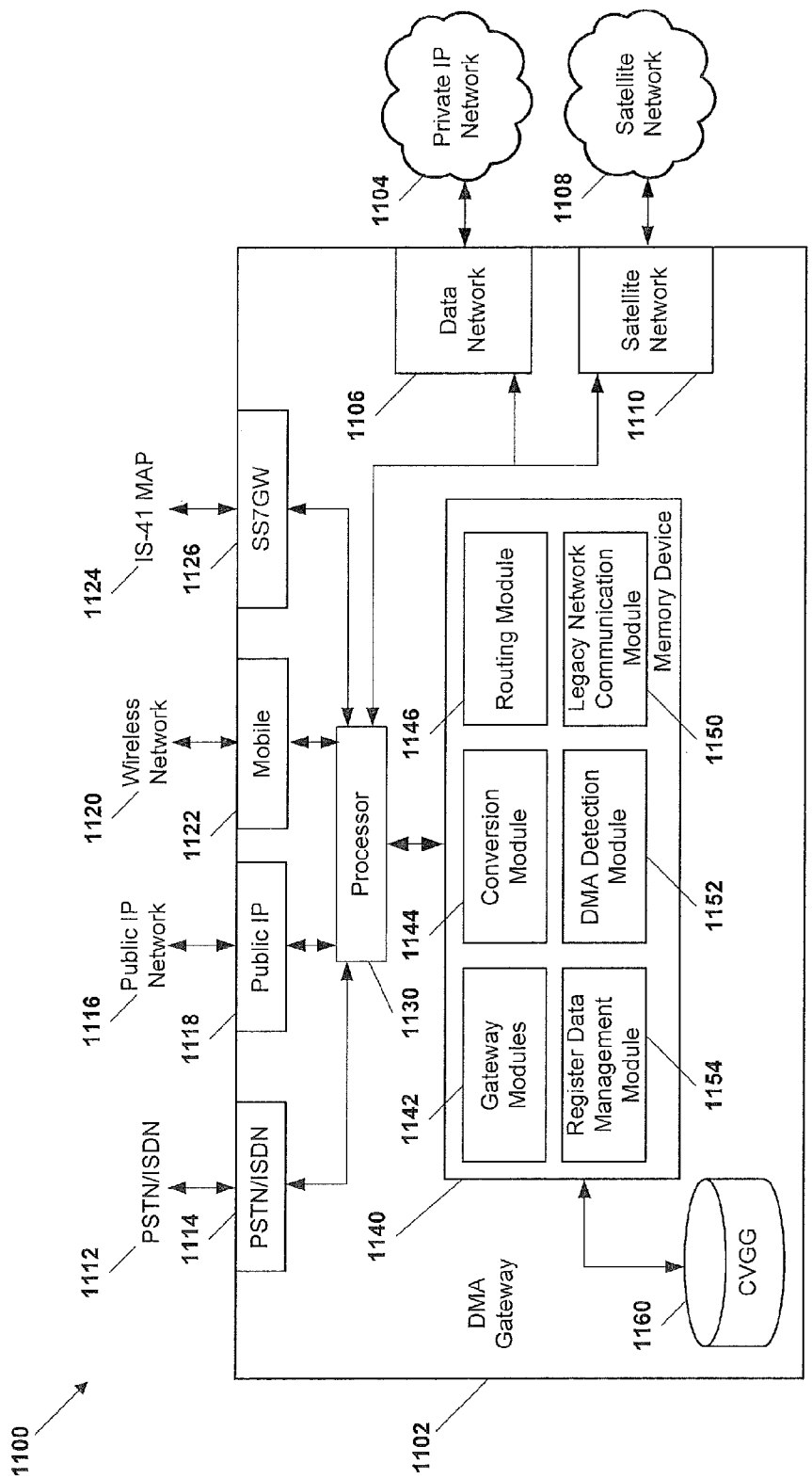
FIG. 11 is a block diagram of a particular illustrative embodiment of a DMA gateway.

FIG. 11 shows an operating environment 1100 including a plurality of networks serviced by a DMA gateway 1102. The DMA gateway 1102 services networks through a plurality of interfaces configured to support different types of networks. The DMA gateway 1102 communicates with a private IP network 1104, such as that used to communicate with one or more DMA servers and/or a central register database as shown in FIG. 7, via a data network interface 1106. The DMA gateway 1102 communicates with the DMA gateway network, which in this example includes a satellite network 1108, via a satellite network interface 1110. In addition, the DMA gateway 1102 includes one or more interfaces that enable the DMA gateway 1102 to communicate with one or more legacy networks. For example, the DMA gateway 1102 communicates with a public switched telephone network (PSTN) or integrated services digital network (ISDN) 1112 via a PSTN/ISDN interface 1114. The DMA gateway 1102 communicates with a public IP network 1116 via a public IP interface 1118 that enables the DMA gateway 1102 to, for example, exchange Internet data or voice over Internet protocol (VoIP) calls. The DMA gateway 1102 also communicates with a wireless network 1120 via a mobile device interface 1122. The DMA gateway 1102 also communicates with an ANSI-41 network 1124 via an SS7 TCAP/SCCP interface 1126 operable to be used in ISUP signaling, DMA server identification, roamer registration, and other functions described with reference to the SS7GW interface 522 described with reference to FIG. 5.

One or more processors 1130 is coupled with the interfaces 1106, 1110, 1114, 1118, and 1122 and a memory device 1140. The memory device 1140 may include one or more of a random access memory, including volatile and nonvolatile rewritable memory devices, a read-only memory, and data storage devices. The memory device 1140 maintains a plurality of software modules providing executable instructions to the processor 1130 to support for the functions of the DMA gateway 1102. The modules include one or more gateway modules 1142 that include the operating system and basic control software that enables the processor 1130 to interact with its network interfaces. One or more conversion modules 1144 control the translation of data and data formats used by one of the networks to that of one or more other networks to which data is to be communicated. One or more routing modules 1146 provide instructions to the processor for routing communications between the appropriate interfaces. The routing instructions use information about the accessibility of devices through various servers, gateways, and networks. Thus, as information about a communication is received, routing instructions are provided indicating through which DMA gateways the communication is to be directed from its source to its destination.

One or more legacy network communications modules provide instructions for the processor 1130 to interact with each of the legacy communications network interfaces 1114, 1118, 1122. One or more DMA detection modules 1152 provide instructions to the processor for detecting the presence of accessible DMA servers and integrating the servers into the DMA network. One or more register data management modules 1154 receive, maintain, and/or forward register data for various networks and devices. The one or more register data management modules 1154 are operably coupled with a community location register (CLR)/visitor location register gateway (VLR)/gateway (GW)/global title (GT) (collectively, CVGG) data storage 1160 to maintain register data for DMA servers and other networks that communicate through the DMA gateway 1102. The register data stored by embodiments according to the present disclosure are described below with reference to FIGS. 9 and 10.

The DMA gateway 1102 may be implemented in a number of forms. For example, the DMA gateway 1102 may be implemented as an orbiting satellite, as described with reference to FIGS. 6 and 7. Alternatively, the DMA gateway 1102 may include either a fixed or portable ground station. The DMA gateways 1102 communicate with each other through a gateway network. In the example of FIGS. 6 and 7, the gateway network includes a satellite communications network. However, if the DMA gateways include only ground-based stations, the gateway network may include a point-to-point network facilitated by microwave communications, optical or other cabled connections, or other types of communications systems. If the gateway network includes both orbiting and ground-based stations, the gateway network may include a combination of satellite-based and non-satellite based communications systems.

Figure 12:
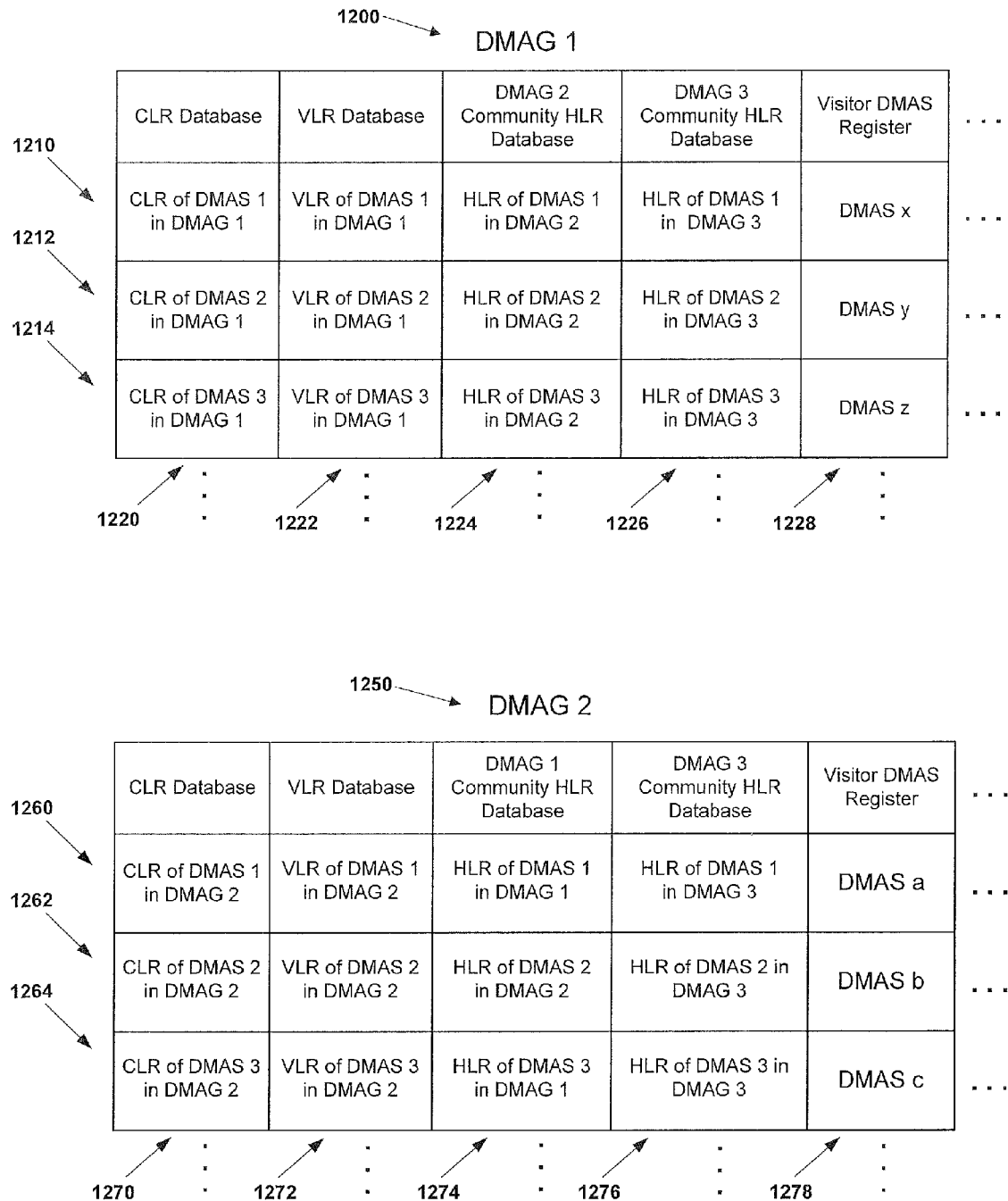
FIG. 12 is a diagram of a particular illustrative embodiment of an exemplary data structure used by a DMA gateway for maintaining information about communications devices accessible through other gateways.
Figure 13:
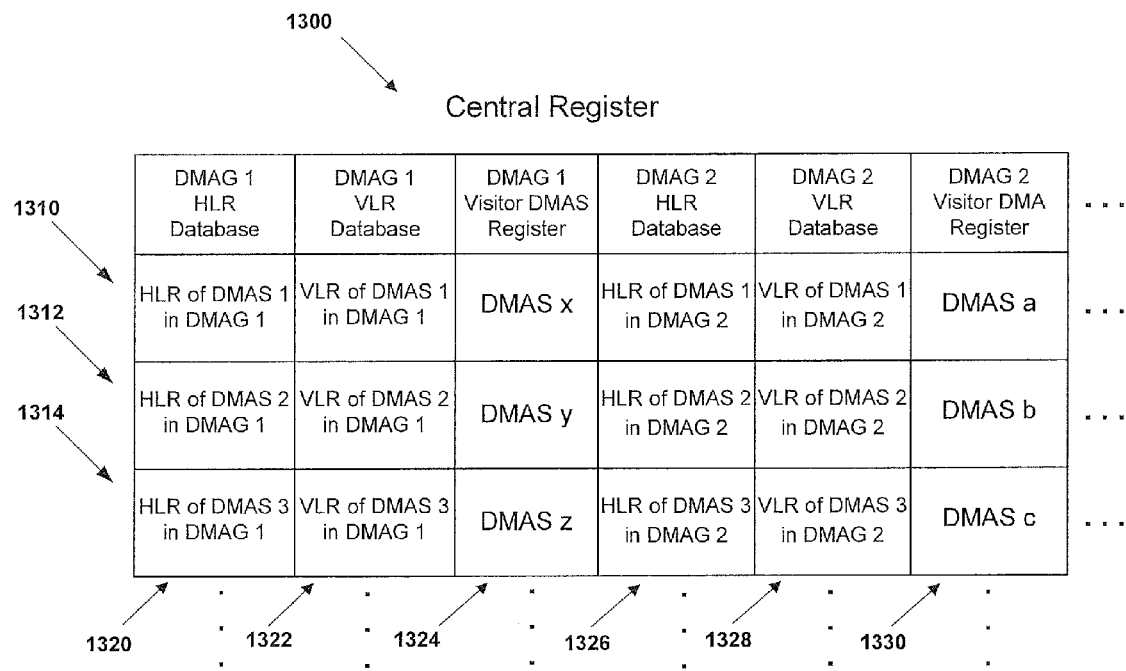
FIG. 13 is a diagram of a particular illustrative embodiment of an exemplary structure maintained in a central database accessible by DMA gateways to maintain information about communications devices accessible throughout a network.

FIGS. 12 and 13 show tables depicting how communications information including register data is stored in the DMA gateways or a central register database. The tables in FIGS. 12 and 13 are a logical representation. The entries within the tables do not represent a single value as might be found, for example, in a single entry of a spreadsheet document. Instead, the entries within the rows and columns of the table represent a category of information stored within the table.

In the example of FIGS. 12 and 13, representative data is shown for three DMA gateways and three DMA servers, although data for any number of DMA gateways and DMA servers participating in a DMA network may be included in register data tables. In this example, it is assumed that each DMA gateway is in communication with a respective DMA server designated with the same number, e.g., DMA gateway 1 is in communication with DMA server 1, etc. FIG. 12 shows tables 1200 and 1250 representing the register data stored in each of DMA gateway 1 and DMA gateway 2, respectively, while FIG. 10 shows a table 1000 representing the register data stored in a central register database for the three DMA gateways.

In the table 1200 for the DMA gateway 1, three rows 1210, 1212, and 1214 store register data for each of the respective DMA servers, DMA server 1, DMA server 2, and DMA server 3. In a CLR database column 1220, CLR data is stored for each of the three DMA servers and, in a VLR database column 1222, VLR data is stored for each of the three DMA servers. In DMAG 2 Community HLR database column 1224 and DMAG 3 Community HLR database column 1226, the HLR data for each of the DMA servers is stored for DMA gateway 2 and DMA gateway 3, respectively. In a Visitor DMA Server Register column 1228, data is stored for one or more DMA servers that are temporarily registered with DMA gateway 1.

In the table 1250 for the DMA gateway 2, three rows 1260, 1262, and 1264 store register data for each of the respective DMA servers, DMA server 1, DMA server 2, and DMA server 3. In a CLR database column 1270, CLR data is stored for each of the three DMA servers and, in a VLR database column 1272, VLR data is stored for each of the three DMA servers. In DMAG 1 Community HLR database column 1274 and DMAG 3 Community HLR database column 1276, the HLR data for each of the DMA servers is stored for DMA gateway 1 and DMA gateway 3, respectively. In a Visitor DMA Server Register column 1278, data for one or more DMA servers that are temporarily registered with DMA gateway 2.

Referring to FIG. 13, in the table 1300 for the central register database, three rows 1310, 1312, and 1314 store register data for each of the respective DMA servers, DMA server 1, DMA server 2, and DMA server 3. In a DMA gateway 1 HLR database column 1320, HLR data is stored for each of the three DMA servers. In a DMA gateway 1 VLR database column 1322, VLR data is stored for each of the three DMA servers. In DMAG 1 Visitor DMA server register column 1324, data is stored for one or more DMA servers that are temporarily registered with DMA gateway 1. In a DMA gateway 2 HLR database column 1326, HLR data is stored for each of the three DMA servers. In a DMA gateway 2 VLR database column 1328, VLR data is stored for each of the three DMA servers. In DMAG 2 Visitor DMA server register column 1330, data is stored for one or more DMA servers that are temporarily registered with DMA gateway 2.

Figure 14:
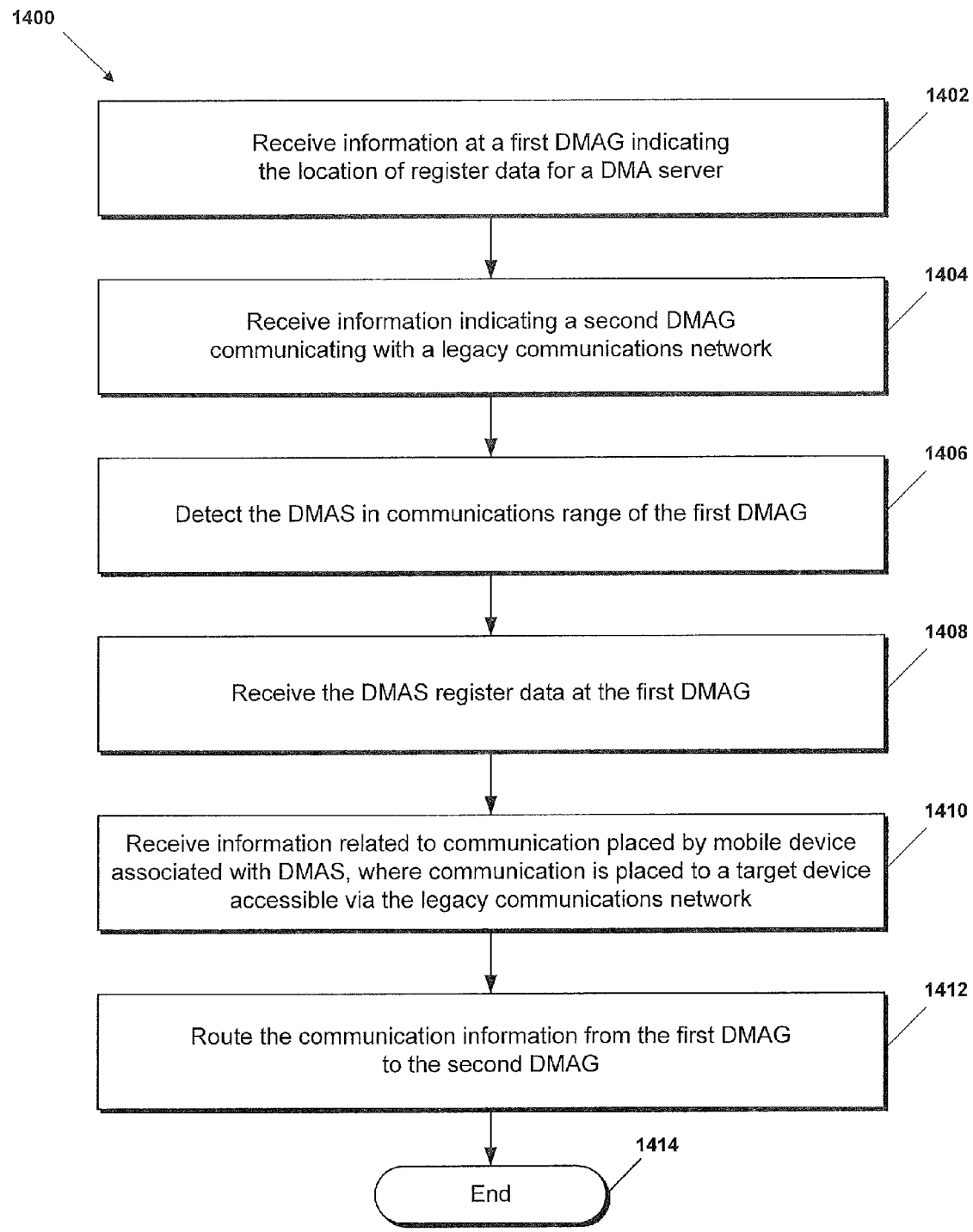
FIG. 14 is a flow chart to illustrate a particular illustrative embodiment of the use of information about accessible networks and devices for routing communications between DMA gateways.

FIG. 14 shows a flow diagram 1400 of an exemplary process for routing communications using DMA gateways. In the example of FIG. 14, a first DMA server comes in communications range or otherwise becomes accessible to a first DMA gateway while a legacy communications network becomes accessible to a second DMA gateway.

At 1402, information is received at a first DMA gateway indicating the location of register data for a DMA server. This register data may be stored in another DMA gateway or a central register database. At 1404, information is received indicating that a second DMA gateway is in communication with a legacy communications network. At 1406, it is detected that the first DMA server is now in communications range of the first DMA gateway. At 1408, the first DMA gateway receives the DMAS register data for the first DMA server from the location identified at 1402. As previously described, this information may be automatically transmitted to the first DMA gateway when it comes within communications range of the first DMA server or the first DMA gateway may request the information from the location where it is stored.

At 1410, information is received that relates to a data and/or voice communication placed by a mobile device associated with the first DMA server. The information indicates that the communication is directed or placed to a target device accessible via the legacy communications network. The accessibility of the legacy communications network to the second DMA gateway was previously identified to the first DMA gateway at 1404. Thus, at 1412, the communication information is routed from the first DMA gateway to the second DMA gateway. The process ends at 1414. The process repeats indefinitely as desired to relay communications using the DMA gateways.

Figure 15:
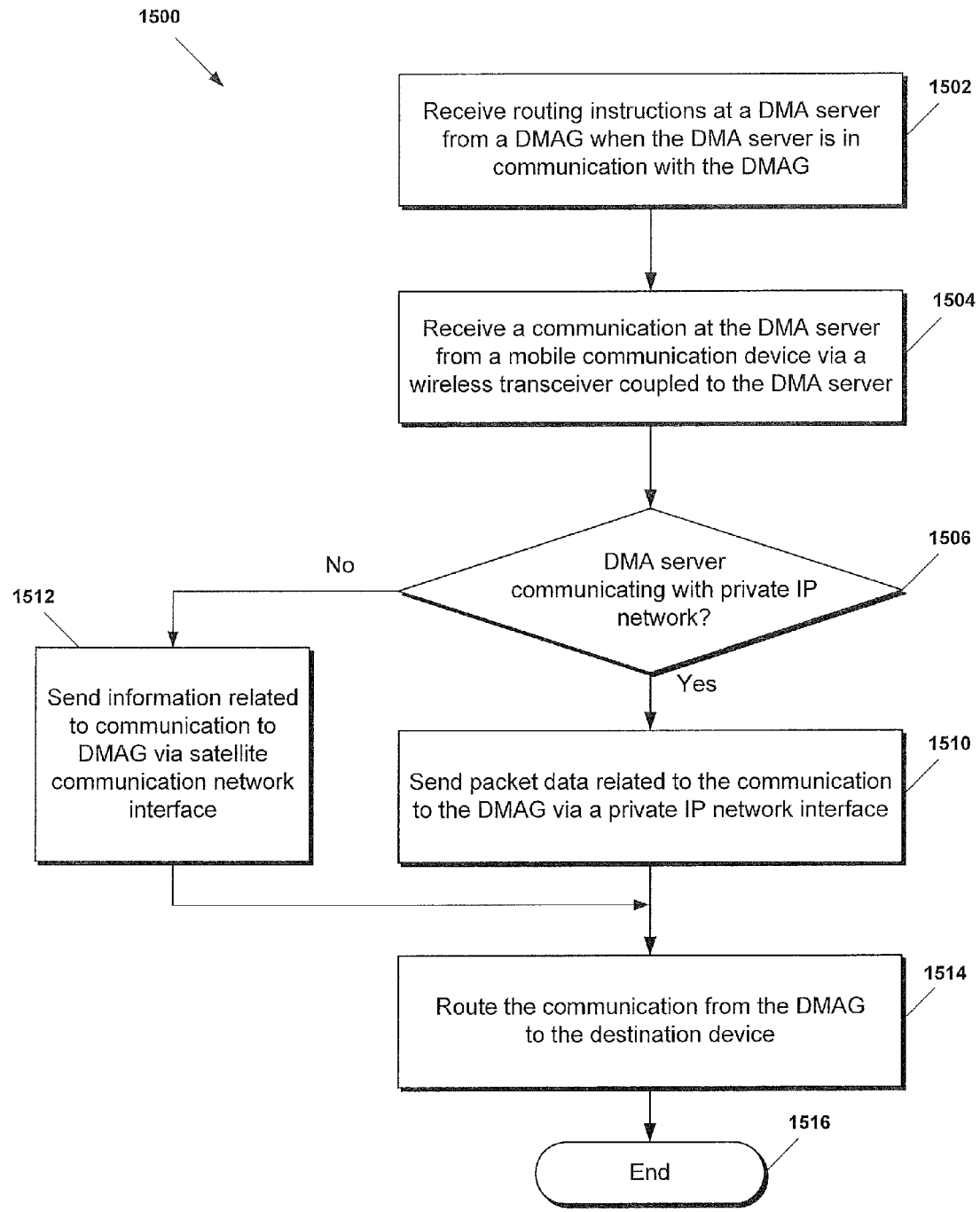
FIG. 15 is a flow chart to illustrate a particular illustrative embodiment of a selective routing of a communication by a DMA gateway via a private Internet Protocol network or a gateway network.

FIG. 15 shows a flow diagram 1500 of an exemplary process for routing communications to a DMA gateway depending on whether the DMA gateway communicates with a server through a private IP network or through another medium. At 1502, routing instructions are received at a DMA server from a DMA gateway when the DMA server is in communication with the DMAG, such as when the DMA gateway comes within communications range of the DMA server. At 1504, a communication is received at the DMA server from a mobile communications device via a wireless transceiver coupled to the DMA server. At 1506, it is determined whether the DMA server communicates with the DMA gateway via a private IP network. If so, at 1510, packet data related to the communication is sent as packet data over the private IP network that is received by the DMA gateway via its private IP network interface. On the other hand, if it is determined at 1506 that the DMA server does not communicate with the DMA gateway via a private IP network, at 1512, the information related to the communication is transmitted to the DMA gateway via another medium, such as a direct satellite uplink. The information related to the communication is thus received by the DMA gateway via a satellite communications network interface.

At 1514, the communication is routed from the DMA gateway to the destination device. The communication is routed using information received and maintained by the DMA gateway as described, for example, in FIG. 14. The process ends at 1516. The process repeats indefinitely as desired to relay communications using the DMA gateways.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
at a first distributed mobile architecture (DMA) gateway of a DMA gateway communication network:
transmitting communications information from the first DMA gateway to a second DMA gateway of the DMA gateway communication network, wherein the communications information is associated with a communication network that is accessible to the first DMA gateway, wherein the communication network and the DMA gateway communication network are different, wherein the first DMA gateway is associated with a first group of DMA servers and the second DMA gateway is associated with a second group of DMA servers different from the first group, and wherein the communications information identifies each DMA server of the first group of DMA servers;
receiving a communication from the second DMA gateway via the DMA gateway communication network, wherein the communication is associated with a destination device that is indicated by the communications information to be served by the communication network that is accessible to the first DMA gateway; and
routing the communication to the destination device.

2. The method of claim 1, wherein the first DMA gateway is located in a first satellite and the second DMA gateway is located in a second satellite and wherein the DMA gateway communication network includes a satellite communication network.

3. The method of claim 1, wherein the communications information is stored in a home location register and wherein the communications information indicates one or more devices that are accessible by a DMA server.

4. The method of claim 3, wherein the DMA server includes one of a ground-based DMA server and a satellite-based DMA server.

5. The method of claim 1, wherein the communications information indicates one or more devices accessible to the first DMA gateway via a legacy communication network.

6. The method of claim 5, wherein the legacy communication network includes one of a public switched telephone network (PSTN), a wireless communication network serviced by a mobile switching center (MSC), a public internet protocol (IP) network, a Signaling System 7 (SS7) link set, a Mobile Application Part (MAP), an American National Standards Institute 41 (ANSI-41) network, a Gateway GPRS Support Node (GGSN), and a data network gateway.

7. The method of claim 1, further comprising receiving a notification at the first DMA gateway from the second DMA gateway, wherein the notification indicates that the communications information is stored at the second DMA gateway.

8. The method of claim 1, wherein the communications information identifies which DMA server of the first group of DMA servers serves the destination device.

9. A non-transitory computer-readable storage medium comprising instructions that, when executed by a processor, cause the processor to:
- transmit communications information from a first distributed mobile architecture (DMA) gateway to a second DMA gateway of a DMA gateway communication network, wherein the communications information is associated with a communication network that is accessible to the first DMA gateway, wherein the communication network and the DMA gateway communication network are different, wherein the first DMA gateway is associated with a first group of DMA servers and the second DMA gateway is associated with a second group of DMA servers different from the first group, and wherein the communications information identifies each DMA server of the first group of DMA servers;
- receive a communication from the second DMA gateway via the DMA gateway communication network, wherein the communication is associated with a destination device that is indicated by the communications information to be served by the communication network; and
- route the communication to the destination device.

10. The non-transitory computer-readable storage medium of claim 9, wherein at least one of the first DMA gateway and the second DMA gateway includes a satellite-based DMA gateway and wherein the DMA gateway communication network includes a satellite communication network.

11. The non-transitory computer-readable storage medium of claim 9, wherein the communications information is stored in a home location register, and wherein the communications information indicates one or more devices that are accessible by a DMA server.

12. The non-transitory computer-readable storage medium of claim 11, wherein the DMA server includes one of a ground-based DMA server and a satellite-based DMA server.

13. The non-transitory computer-readable storage medium of claim 12, wherein the communications information indicates one or more devices accessible to the first DMA gateway via a legacy communication network.

14. The non-transitory computer-readable storage medium of claim 13, wherein the legacy communication network includes one of a public switched telephone network (PSTN), a wireless communication network serviced by a mobile switching center (MSC), a public internet protocol (IP) network, a Signaling System 7 (SS7) link set, a Mobile Application Part (MAP), an American National Standards Institute 41 (ANSI-41) network, a Gateway GPRS Support Node (GGSN), and a data network gateway.

15. The non-transitory computer-readable storage medium of claim 9, wherein the processor receives a notification from the second DMA gateway, wherein the notification indicates that the communications information is stored at the second DMA gateway.

16. An apparatus comprising:
- a first distributed mobile architecture (DMA) gateway comprising:
  - a first interface configured to communicate with a legacy communication network;
  - a second interface configured to communicate with a private Internet Protocol (IP) network;
  - a third interface configured to communicate with a DMA gateway communication network; and
  - a server having logic configured to:
    - transmit communications information to a second DMA gateway of the DMA gateway communication network, wherein the communications information is associated with a communication network that is accessible to the first DMA gateway, wherein the communication network and the DMA gateway communication network are different, wherein the first DMA gateway is associated with a first group of DMA servers and the second DMA gateway is associated with a second group of DMA servers different from the first group, and wherein the communications information identifies each DMA server of the first group of DMA servers;
    - receive a communication from the second DMA gateway via the DMA gateway communication network, wherein the communication is associated with a destination device that is indicated by the communications information to be served by the communication network; and
    - route the communication to the destination device.

17. The apparatus of claim 16, wherein the communications information is stored in a home location register and wherein the communications information indicates one or more devices that are accessible by a DMA server.

18. The apparatus of claim 17, wherein the DMA server includes one of a ground-based DMA server and a satellite-based DMA server.

19. The apparatus of claim 18, wherein the communications information indicates one or more devices accessible to the first DMA gateway via the legacy communication network.

20. The apparatus of claim 19, wherein the legacy communication network includes one of a public switched telephone network (PSTN), a wireless communication network serviced by a mobile switching center (MSC), a public internet protocol (IP) network, a Signaling System 7 (SS7) link set, a Mobile Application Part (MAP), an American National Standards Institute 41 (ANSI-41) network, a Gateway GPRS Support Node (GGSN), and a data network gateway.

\* \* \* \* \*